US008832476B2

(12) United States Patent
Fan et al.

(10) Patent No.: US 8,832,476 B2
(45) Date of Patent: Sep. 9, 2014

(54) POWER ALLOTMENT DISTRIBUTION IN A DATA CENTER

(75) Inventors: Xiaobo Fan, Sunnyvale, CA (US); Chris Sadler, Mountain View, CA (US); Selver Corhodzic, Santa Clara, CA (US); Wolf-Dietrich Weber, San Jose, CA (US); Taliver Brooks Heath, Mountain View, CA (US); Mark Hennecke, Cupertino, CA (US)

(73) Assignee: Google Inc., Mountain View, CA (US)

( * ) Notice: Subject to any disclaimer, the term of this patent is extended or adjusted under 35 U.S.C. 154(b) by 288 days.

(21) Appl. No.: 12/892,116

(22) Filed: Sep. 28, 2010

(65) Prior Publication Data

US 2012/0078430 A1 Mar. 29, 2012

(51) Int. Cl.
G06F 1/32 (2006.01)
G06F 1/26 (2006.01)
G06F 1/18 (2006.01)

(52) U.S. Cl.
USPC .............................. 713/310; 713/300; 700/22

(58) Field of Classification Search
None
See application file for complete search history.

(56) References Cited

U.S. PATENT DOCUMENTS

| | | | |
|---|---|---|---|
| 4,814,932 A | 3/1989 | Morelli | |
| 5,604,385 A | 2/1997 | David | |
| 6,018,203 A | 1/2000 | David et al. | |
| 8,054,598 B1 * | 11/2011 | Sadler et al. | 361/63 |
| 2006/0156041 A1 | 7/2006 | Zaretsky et al. | |
| 2007/0300083 A1 | 12/2007 | Goodrum et al. | |
| 2008/0178032 A1 | 7/2008 | Walrath | |
| 2009/0070611 A1 | 3/2009 | Bower, III et al. | |
| 2010/0102625 A1 | 4/2010 | Karimi et al. | |
| 2012/0078430 A1 * | 3/2012 | Fan et al. | 700/295 |

OTHER PUBLICATIONS

International Search Report and Written Opinion; Gu, Kwak In; Apr. 10, 2012; World Intellectual Property Organization (WIPO) (International Bureau of); PCTUS2011053222; 9 pages.
Authorized Officer Nora Lindner; International Preliminary Report on Patentability dated Apr. 11, 2013 for PCT/US2011/053222, 6 pages.
Fan, et al "Power Provisioning for a Warehouse-sized Computer" in Proceedings of the ACM International Symposium on Computer Architecture, San Diego, CA Jun. 2007.
Femal, et al. "Safe Overprovisioning: Using Power Limits to Increase Aggregate Throughput" Department of Computer Science North Carolina State University. 2005.
Lefurgy, et al. "Server-level Power Control" Fourth International Conference on Autonomic Computing (ICAC 2007).
Filani, et al. "Dynamic Data Center Power Management: Trends, Issues, and Solutions" Intel Technology Journal vol. 12, Issue 1, (Feb. 21, 2008).
"Smart Fridges stay cool by talking to each other" Commonwealth Scientific and Industrial Research Organisation. 1-4. Jan. 13, 2009.

* cited by examiner

*Primary Examiner* — Tanh Nguyen
(74) *Attorney, Agent, or Firm* — Fish & Richardson P.C.

(57) ABSTRACT

In a computer-implemented method, an electronic communication from a first computing machine is received and includes a power value and one or more priority values. The power value represents a request for a power allotment expected to be used during a predetermined time and the priority values represent priorities of tasks expected to be executed during the predetermined time. A score for the request is calculated using a scoring function and the received priority values as inputs to the scoring function. The score is compared to one or more other scores respectively associated with requests for power allotments from other computing machines and previously calculated using the scoring function following receipt of one or more electronic communications each including a power value and one or more priority values. A top-ranked score is identified and an electronic communication is sent to the associated computing machine granting the requested power allotment.

18 Claims, 14 Drawing Sheets

POWER ALLOTMENT DISTRIBUTION IN A DATA CENTER

TECHNICAL FIELD

Various implementations in this document relate generally to electrical power distribution.

BACKGROUND

In general, power distribution systems, such as those for large computer data centers, receive high voltage and/or high current electrical power from a utility provider, generator station, or other source of power. The power distribution systems may transform the received power and provide it to electrically-powered equipment, such as the computers and cooling equipment (e.g., chillers, fans, and pumps) in a data center. Electrical power is generally conducted by high current conductors that may be split into two or more branch conductors to divide and distribute electrical power. Some of these branches may be split to further divide and distribute electrical power. Each of the electrical conductors may be protected by circuit breakers, and/or other over-current protection devices to stop the flow of electrical currents in excess of the conductors' ratings.

Electrical devices are generally rated for a maximum current draw, and in some instances these ratings can be somewhat conservative. In addition, the electrical devices may only occasionally, if ever, draw their rated currents. In some instances, power distribution systems can be conservatively built to supply the devices' rated currents. The collective power of the devices connected to branches of the power distribution system may remain conservatively below the breaker limit for their respective branch, and the attached devices may not be drawing their maximum amount of power simultaneously. Overall, a power distribution system may leave some portion of the available power unused, and the amount of unusable power may increase as the number of power branches increases.

SUMMARY

This disclosure describes methods, systems, and devices that can be used to allocate power dynamically among various computing machines in a distributed system of computing machines. Such techniques may involve having computing machines, such as computer servers or groups of servers, provide a request that announces a power value and a priority for power that they need over a determined time period. Scores may be assigned to various requests, and each machine may be told the level of power it can use based on its respective score. Each of the machines may then follow such orders in using power during the determined time period.

The limitations on power use by particular machines may be effectuated in various manners. For example, machines may self-limit their power use by taking on only computing activities that are expected to have a power usage that is within an amount of power that has been allocated to the particular computers. As such, the power control system may have application awareness, in that the power system can have an understanding of the relationship between the performance of particular types of tasks, and the electrical power needed to perform those tasks. Alternatively, mechanisms external to the computers, such as circuit breakers, may limit the amount of power that can be used by particular computers or groups of computers. These two approaches may be analogized, respectively, to demand-side power management and supply-side power management.

In a first general aspect, a computer-implemented method of allocating power dynamically among a plurality of computing machines in a distributed system of computing machines includes receiving, at a first computing device, a first electronic communication from a first computing machine in a distributed system of computing machines. The first electronic communication includes: i) a first power value, and ii) one or more first priority values, where the first power value represents a first request for a first power allotment that is expected to be used by the first computing machine during a predetermined period of time and the one or more first priority values represent priorities of one or more tasks expected to be executed by the first computing machine during the predetermined period of time. The method also includes calculating, at the first computing device using a scoring function and the received one or more first priority values as inputs to the scoring function, a first score for the first request from the first computing machine. The method further includes comparing, at the first computing device, the calculated first score to one or more other scores respectively associated with one or more other requests for power allotments from computing machines different from the first computing machine, where the one or more other scores have been previously calculated using the scoring function in response to receipt, by the first computing device, of one or more electronic communications each comprising a power value and one or more priority values from the respective one or more computing machines different from the first computing machine, the one or more other scores stored in a memory accessible by the first computing machine. The method further includes identifying, at the first computing device, a top-ranked score from the calculated scores and sending a second electronic communication to the computing machine associated with the top-ranked score, wherein the second electronic communication grants the power allotment requested by the computing machine associated with the top-ranked score.

Implementations can include one or more of the following. The first computing machine may send the first electronic communication after determining that the one or more tasks expected to be executed by the first computing machine during the predetermined period of time will require more power than an available amount of power assigned to the first computing machine. The first computing machine may limit its power consumption to the available amount of power assigned to the first computing machine while its request for the first power allotment is pending at the first computing device. The one or more other scores may be maintained in an ordered electronic list of scores by the first computing device, and comparing the calculated first score to the one or more other scores may include determining an appropriate position within the ordered electronic list of scores for the calculated first score and placing the calculated first score within the ordered electronic list of scores at the appropriate position. An electronic reserve list of computing machines that are each operating below a respective power limit assigned to the respective computing machine may be maintained at the first computing device. The first computing device may send a third electronic communication to a third computing machine from the electronic reserve list, where the third electronic communication provides a new power limit for the third computing machine, and the new power limit is lower than the power limit previously assigned to the third computing machine. A difference between the power limit previously assigned to the third computing machine and the new power limit for the third computing machine may be substantially equal to the power allotment granted to the computing machine associated with the top-ranked score.

The power allotment requested by the computing machine associated with the top-ranked score may exceed an amount of reserve power associated with the computing machines in the electronic reserve list, and the first computing device may send a fourth electronic communication to a second computing device, where the fourth electronic communication includes a fourth power value that represents a request for a power allotment and one or more priority levels. The fourth power value may represent a difference between the power allotment requested by the computing machine associated with the top-ranked score and the amount of reserve power associated with the computing machines in the electronic reserve list. The predetermined period of time may correspond to a period of an alternating current cycle, and the first computing device may control power allocation to a plurality of computing machines at a control granularity of the period of the alternating current cycle. The alternating current cycle may be about 60 Hz. The first computing device may source the granted power allotment from an excess capacity of a single computing machine, or from excess capacities of two or more computing machines.

The details of one or more embodiments are set forth in the accompanying drawings and the description below. Other features and advantages will be apparent from the description and drawings, and from the claims.

DESCRIPTION OF DRAWINGS

This document describes these and other aspects in detail with reference to the following drawings.

Like reference symbols in the various drawings indicate like elements.

DETAILED DESCRIPTION

Figure 1:
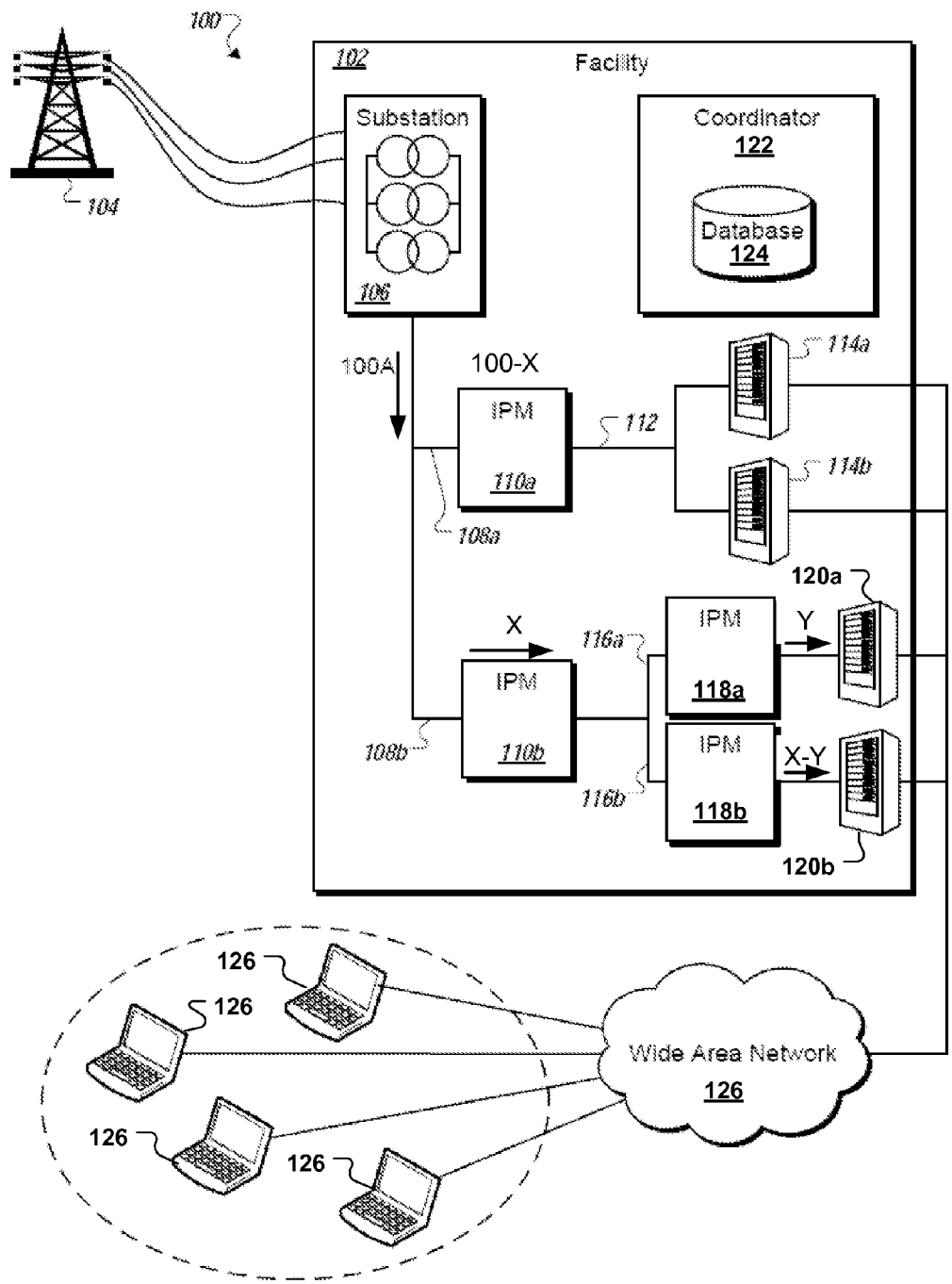
FIG. 1 shows an example power distribution system for the dynamic allocation of power capacity to power nodes.

Systems, methods, and apparatuses for distributing electrical power allotments within a distributed system of computing machines are discussed herein. In various implementations, one or more power regulators within the system may make electrical power distribution, or redistribution, decisions based on one or more factors, such as an amount of power requested by a computing machine, an amount of reserve power capacity available (e.g., among one or more computing machines operating below a respectively assigned power capacity), one or more priorities or latency considerations associated with tasks that are executing or expected to be executed by a requesting machine, one or more priorities or latency considerations associated with tasks executing or expected to be executed by a machine having reserve capacity, a time period corresponding to an alternating current cycle associated with a supply source of electrical power, and others. The regulators may receive requests for power allotments or power utilization updates from individual computing machines, and may grant power allotment requests from computing machines on a machine-by-machine basis.

The power usage by the machines may be enforced by power enforcers, where each enforcer may be associated with a particular machine. The enforcers may be implemented, for example, as daemon's operating in the background on each of the computing machines in the system, where each daemon is responsible for enforcing power usage, according to budgeted levels, for the machine on which it is executing. The enforcers may be, for example, a component of the machine kernels, and may execute as high priority threads on the machines. The enforcers may also request to have their power allocations raised or lowered, as needed, and may then enforce whatever allocation is subsequently granted to them.

Where the power enforcers are implemented in this manner as daemons, a power allocation system like that discussed here may communicate with and interact with a task allocation system for the computing devices. Thus, for example, the task allocation system may have capabilities to anticipate computing loads on a system and may communicate such anticipated computing loads so that the power allocation system can begin to make power allocation decisions in anticipation of the coming computing loads (which have corresponding electrical power loads). Similarly, while expected power loads can be inferred based on knowledge about the connection between computing loads and power loads, such knowledge can be improved by time correlating information from a computing load allocation system and a power allocation system so as to gain a better understanding of the relationship between computing load and power load in individual computing devices and across groups of computing devices.

In some implementations, power utilization may be improved because power capacity may be diverted from a computing machine that is operating, schedule to operate, or expected to operate below an existing power capacity that has been assigned to the machine to a computing machine that is operating, scheduled to operate, or expected to operate above an existing power capacity assigned to the machine. Additionally, because power distribution decisions can be made based on priorities or latencies of tasks associated with a power-allotment-requesting machine (or of a machine having excess capacity), such improvements in utilization may be achieved in a fashion that is transparent or that minimizes adverse impact on application performance from a user's perspective. A system may thus be relatively highly oversubscribed in appropriate circumstances but may be controlled to prevent actual overloading, so that a particular node may have lower capacity that is currently allotted to machines below the node. Also, decision making for power distribution can be centrally controlled by a central system that has a high level of knowledge but is relatively slow to react, and can be controlled at a lower level using devices whose knowledge is isolated but that can have faster reaction times.

In some implementations, the regulators, enforcers, and computing machines may be logically organized in a hierarchical structure, and power distribution decisions may be made with reference to predefined relationships among computing machines (and associated enforcers), regulators, or both within the hierarchical structure. For example, the regulators and machines may be logically organized in a "tree" structure of nodes and edges, and the devices may communicate with one another according to a predefined protocol. In some implementations, each computing machine may represent a leaf node (that is, a node without any child nodes) of the tree structure. The tree structure may have any appropriate number of levels, and in some implementations the regulators may represent nodes of the tree at levels above the lowest level. In yet other implementations, other arrangements may be provided, including more simplified arrangements.

When a regulator grants a power allotment request, it may send a communication to the corresponding communication machine to inform the machine (e.g., the enforcer running as a daemon application on the machine) that the request has been granted. In some cases, the regulator may specify a new power capacity for the machine that corresponds to a previously assigned capacity plus the granted allotment. In some implementations, the communication granting the request may specify a power value that corresponds to the additional power allotment that has been granted. A regulator may assign a new power capacity value that is lower than a previously assigned power amount to a computing machine, and may do so on a machine-by-machine basis. In this fashion, utilization within the system may be improved as the regulators may make efficient, timely, and intelligent power distribution decisions on a machine-by-machine basis to direct available power capacity within the system to those machines most deserving of it, and the enforcers may implement (and attempt to adjust) such restrictions at a local, very responsive, level.

For example, a regulator may receive requests for power additional power capacity from computing machines that desire additional power capacity over a presently assigned capacity. The requests may be electronic communications that include a power value that corresponds to the amount of additional power capacity desired by the respective machine, and one or more priority values that correspond to one or more tasks to be executed by the machine over a predetermined time period. The regulator may score or rank received requests using a scoring function, that takes task priority values as inputs, and produces a value or score for each request, and may make power distribution decisions based on scores associated with the requests. As such, the regulator may make power distribution decisions based in part or in whole on information received from machines below it in the hierarchy and requests from those machines.

FIG. 1 shows an example power distribution system 100 that includes dynamic allocation of power capacity to nodes in the system 100. The allocations for each node are configured to achieve improved utilization of electrical distribution infrastructure by allowing a network of current protection devices to intelligently negotiate power allocations in response to dynamic load conditions. The current protection devices, which make act as enforcers of decisions regarding power allocations in the system, may, in particular implementations, be devices on the power input sides of computing machines in the system 100 (but separate from the computing devices themselves, or part of the devices but physically separate from the main processors for the devices), or software running on the machines themselves, such as a kernel-derived daemon executed in the background on a server and controlling the amount of computer activity the computing device can undertake (so as to thereby indirectly control the amount of power the computing device demands).

For example, in the example depicted in FIG. 1, the power distribution system 100 includes a number of such power limiters, or intelligent protection modules (IPMs), that negotiate power allocations to dynamically shift capacity to route power needed by various load circuits (e.g., individual computers or groups of computers (e.g. cores) on a common chip or a common motherboard) under variable load conditions, while protecting the source node (e.g., when the IPM is a piece of hardware that controls current to a device) or the more general system (e.g., when the IPM operates as an application on a device so that the device operates to avoid drawing too more power) against overloads that would exceed the source node's predetermined capacity limit. For example, when current through an IPM approaches full (e.g., 100%, greater than 90%, greater than 85%) utilization of its present capacity allocation, the IPM may generate a request message asking IPMs at peer, parent, and/or child nodes to reallocate a portion of their present power capacity to the requesting IPM. Similarly, during periods when the IPM has unused allocated capacity (e.g., less than 100%, less than 50%, less than 25%, less than 10%), the IPM may, for example, respond to request messages from other IPMs by negotiating to reallocate at least a portion of its capacity to other IPMs. Accordingly, a number of IPMs can operate together to automatically negotiate a capacity sharing arrangement that adapts to the dynamic load conditions to achieve improved utilization of infrastructure power handling capability to distribute power to meet peak power demands at different loads.

In certain implementations, IPMs at the leaf level may be implemented as daemons running on particular machines, and IPMs at higher levels in a hierarchy may be implemented as separate hardware devices from the machines at the leaf nodes. In some implementations, the reporting, requesting, and allocating of resources (e.g., power) may be strictly hierarchical, so that IPMs at leaf nodes may requests up the chain of command, and IPMs at higher nodes are responsible for coordinating all such communication from IPMs at nodes beneath them, and also in allocating and managing the allocation of power to nodes beneath them. In other implementations, certain levels of communication may appear on a peer-to-peer basis on some levels of the hierarchy (e.g., at upper nodes, but not at leaf nodes) or at all levels of the hierarchy. In some implementations, a system 100 may have a root node master controller, a number of IPMs at a next lower level, and IPMs at a next level that is a leaf level. In other implementations, a system 100 may have additional levels of IPMs.

The power distribution system 100 includes a facility 102 that receives high voltage and/or current power from an electrical utility provider 104. The facility 102 includes a power substation 106. The power substation 106 transforms the high voltage and/or current power into usable voltages and/or currents for electrical loads in the facility 102, and distributes the transformed power to a branch conductor 108*a* and a branch conductor 108*b*.

The branch conductor 108*a* includes an intelligent protection module (IPM) 110*a*, and the branch conductor 108*b* includes an IPM 110*b*. The IPM 110*a* provides over-current protection for a circuit 112 that supplies power to a server computer rack 114*a* and a server computer rack 114*b*. The IPM 110b provides over-current protection for a branch conductor 116a and a branch conductor 116b. The branch conductors 116a and 116b include an IPM 118a and 118b, respectively. The IPMs 118a and 118b provide over-current protection for a server computer rack 120a and a server computer rack 120b, respectively.

The over-current protection may be implemented in software for a particular node, such as for leaf node IPMs that are implemented as a daemon of a computing machine. Such over-current protection may be asserted proactively, by the machine taking on a certain number and/or type of computing tasks that is understood from past experience or otherwise to translate into a certain power requirement. Limited the number and type of tasks may be performed by the machine itself, by the machine in cooperation with a task routing system (e.g., with the machine telling the system the level of tasks that it can accept or the system telling the machine the level of tasks it will be receiving), or in another similar manner.

The IPMs 110a, 110b, 118a, and 118b, are able to vary their over-current protection trip points (or proactive demand points) and can communicate with each other to allocate power from a shared supply. In some implementations, the IPMs 110a, 110b, 118a, and 118b can communicate in a peer-to-peer network. For example, the IPM 110a may send a message to the IPM 110b to request that the IPM 110b reduce its over-current protection trip or demand point. If the request is granted, the IPM 110a may then raise its own trip or demand point by a substantially like amount. In some implementations, the IPMs 110a, 110b, 118a, and 118b can communicate with an information management system 122 that includes a database 124. For example, the IPMs may communicate with the information management system 122 to request and/or receive power allocation settings, or to send and/or receive statuses, alarms, notifications, configurations, or other data that may be used by the IPMs 110b, 118a, and 118b. In some implementations, the information management system 122 can access the database 124 to store and retrieve information relating to the IPMs 110b, 118a, and 118b.

The server racks 114a, 114b, 120a, and 120b, serve information to and from a number of computers 126 via a wide area network (WAN) 128. In some implementations, the computers 126 can place varying computing loads upon the server computer racks 114a, 114b, 120a, and 120b. For example, the computer server racks 114a and 114b may host email services, and the server computer racks 120a and 120b may host video sharing services. Demand for these two different services can vary as the amount of traffic from the computers 126 varies. For example, demand for email services may increase in the daytime as users of the computers 126 access their email for work, but in the evening the demand for email services may decrease while the demand for video sharing services increases as people browse videos during their free time.

As the computing loads vary, electrical current needs of the server computer racks 114a, 114b, 120a, and 120b can vary as well. For example, during the day the computing loads placed upon the server computer racks 114a and 114b may cause the server computer racks 114a and 114b to draw 60 A of electrical power in order to operate, while the server computer racks 120a and 120b draw 20 A. At night, the server computer racks 114a and 114b may experience lower computing loads and therefore draw 40 A while the server computer racks 120a and 120b may experience increased computing loads and a 70 A draw.

The branch conductors 108a and 108b share a 100 amp supply in this example. The intelligent protection module 110b is configured to allow a number of amperes of current, designated as "X", to pass onto the conductors 116a and 116b, and the intelligent protection module 110a is configured to allow the remaining number of amperes of current, designated by the value "100-X", to pass along the conductor 112. As the electrical current demand of the server computer racks 120a and 120b varies, the value of "X" can vary as well. For example, the loads connected to the IPM 110b may draw approximately 75 A, leaving approximately 25 A of capacity available for use by the loads connected to IPM 110a without exceeding the 100 A supply. Similarly, the server computer rack 120a may draw "Y" amps of current, leaving "X-Y" amps available for use by the server computer rack 120b.

In some implementations, by intelligently allocating capacity among the IPMs 110a, 110b, 118a, and/or 118b, electrical power utilization can be increased without increasing the electrical supply capacity. For example, IPMs 110a and 110b can be initially allocated 50 A each while the server computer racks 114a and 114b are drawing 10 A each, the server computer racks 120a and 120b are drawing 20 A each, and the IPMs 118a and 118b may be allocated 25 A apiece. The IPM 110a has approximately 30 A of excess capacity (50 A−(2×10 A)=30 A), while the IPM 110b may have 10 A (50 A−(2×20 A)=10 A). As computing demands change, the server computer rack 120a may draw 40 A, exceeding the allocation given to the IPM 118a. In some implementations, the IPM 118a can request the IPM 118b grant some or all of its excess 5 A capacity. If granted, the IPM 118b can reduce its allocation to 20 A and the IPM 118a can increase its own allocation to 30 A.

In this example, the IPMs 118a and 118b have substantially maximized their use of the 50 A allocated to the IPM 110b. However, there remains a 10 A shortage along the branch conductor 116a. In some implementations, the IPM 110a can request an additional power allocation from the upstream IPM 110b (i.e., which is closer to the root node in the hierarchy). For example, the IPM 118a can request an additional 10 A allocation from the IPM 110b. However, in this example, the IPM 110b is already passing 50 A of its 50 A allocation. In some implementations, the IPM 110b can send a message to the IPM 110a to determine if the IPM 110a has any unused capacity that could be re-allocated to the IPM 110b.

For example, the IPM 110b may request a 10 A allocation from the IPM 110a. Because the IPM 110a has 30 A of excess capacity, the IPM 110a may lower its own allocation by 10 A and grant that allocation to the IPM 110b. The IPM 110b can then raise its allocation by 10 A to a total of 60 A, thereby satisfying the power needs of the server computer racks 120a and 120b, and increase the utilization of the 100 A available from the substation 106. Additional examples of intelligent power allocation are discussed in further detail in relation to FIGS. 2-9.

Figure 2:
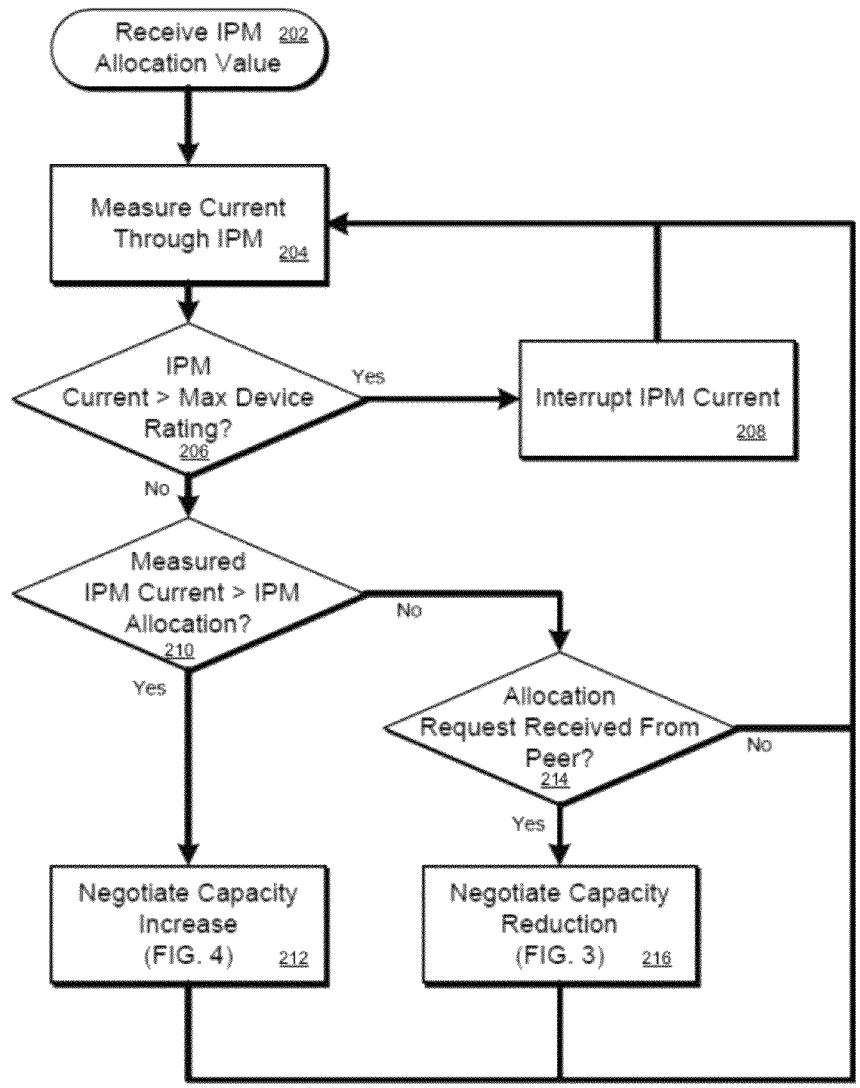
FIG. 2 is a flow diagram of an example intelligent power allocation process.

FIG. 2 is a flow diagram of an example intelligent power allocation process 200. The process begins when an intelligent protection module (IPM) (e.g., the IPM 110a of FIG. 1) receives a power allocation value 202. In some implementations, the allocation value can be received from a source internal to the IPM. For example, an allocation value can be received from a default startup value, an internally calculated value, a value determined from a lookup table, or other source of allocation values internal to the IPM. In some implementations, the allocation value is received from a source external to the IPM. For example, the allocation value can be received from a user, from a database (e.g., the information management system 122), from other IPMs, or from other external sources of allocation values.

After the allocation value is received 202, the electrical current that passes through the IPM is measured 204. The measured IPM current is compared to the maximum device rating of the IPM. For example, the IPM may carry a maximum amperage rating that represents the number of amps that the IPM can carry before the IPM experiences physical damage. Alternatively, where the IPM is implemented as software operating on a leaf machine, the current may be inferred by understanding the nature of tasks being handled by the machine.

If the IPM current is determined 206 to be greater than the present allocation, then the IPM current is interrupted 208. Likewise, the machine may proactively refuse to take on tasks, or an allocation may decline to assign tasks, that would push the machine over its allocated power limit. In some implementations, interrupting the IPM current can prevent the IPM, or other devices or components connected to the IPM's circuit, from being damaged due to an over-current condition.

In some implementations, a message can be sent to other IPMs or to an information management system to update them of the current interruption 208, or of a machine hitting its maximum load of tasks or other measures of load on the system that can be fairly translated into power load. For example, an upstream IPM can notify downstream IPMs of the current interruption 208 or other similar event, and the downstream IPMs can respond by reducing their own allocations or interrupting their own currents to reduce the total current load that can be placed upon the upstream IPM to a level below the upstream IPM's maximum device rating.

In another example, the information management system can be notified of the current interruption 208 or other hitting of a maximum load, and the information management system can respond by alerting technicians to rectify the over-current condition, such as by automatically reducing the computing loads assigned to server computer racks (e.g., the computer server racks 114a, 114b, 120a, and 120b of FIG. 1), thereby reducing the racks' current draws, or by responding in other ways to rectify the conditions that caused the over-current to pass through the IPM. In some implementations, the current interruption 208 may be reversed. For example, a technician can manually reset the IPM current protection components, or a message from the information management system or another IPM may signal the IPM to reset the current interruption 208.

If the IPM current is determined 206 to be less than or equal to the present allocation, then the measured IPM current is compared (either measured directly or inferred from another measure) to the IPM's allocation. If the IPM current is determined 210 to be greater than the IPM's allocation, then a capacity increase is negotiated 212. In some implementations, the IPM can increase its own capacity by requesting and receiving additional electrical current allocations from other IPMs. An example process for negotiation of a capacity increase is discussed in the description of FIG. 4. If the IPM current is determined 210 to be equal to or less than the IPM's allocation, then a determination 214 is made in response to the receipt of an allocation request from a peer. If no allocation request is determined 214 to have been received from a peer, then the process 200 measures 204 current passing through the IPM (or infers such current).

If an allocation request is determined 214 to have been received from a peer, then a capacity reduction is negotiated 216. In some implementations, the IPM can reduce its own capacity in response to a request from other IPMs. An example process for negotiation of a capacity reduction is discussed in the description of FIG. 3.

Figure 3:
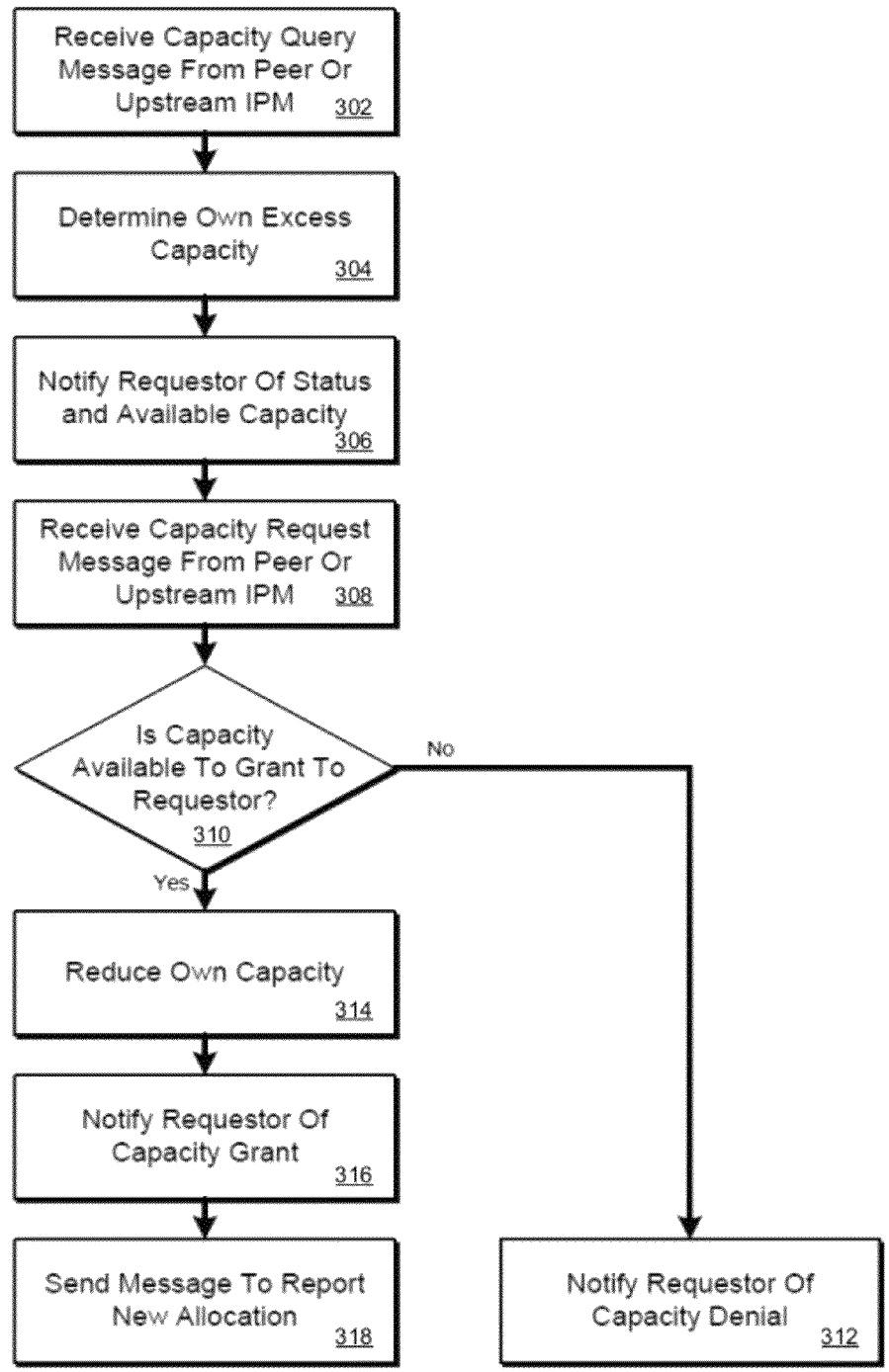
FIG. 3 is a flow diagram of an example capacity reduction negotiation process.

FIG. 3 is a flow diagram of an example capacity reduction negotiation process 300. In some implementations, the process 300 may be the capacity negotiation process illustrated by step 216 of FIG. 2. The process 300 begins when a capacity query message from a requesting IPM is received 302. The IPM determines 304 its own status and excess capacity. For example, status information can include electrical current measurements, device ratings, present allocation settings, computing or power load variability information, computing or power load trend information, and/or other information that can describe the status of an IPM.

The requestor is then notified 306 of the status and available capacity. The requestor can use the notification 306 to determine if a request for capacity should be sent. This determination is discussed in the description of FIG. 4.

A request message for capacity is then received 308 from the requesting IPM. If the requested capacity value is determined 310 to be unavailable to grant to the requestor, then the requestor is notified 312 of the capacity denial. Otherwise, if the requested capacity value is determined 310 to be available to grant to the requestor, then the IPM reduces 314 its own capacity by the requested capacity value in the capacity request message, and sends a message to notify 315 the requestor of the capacity grant. In some examples, the IPM may have more excess capacity than is being requested, and the IPM may respond by reducing 314 its own allocation by the requested capacity value and notifying 316 the requestor that it may increase its allocation by the requested amount. In some examples, the IPM can have less excess capacity than is being requested, and the IPM can respond by reducing 314 its own allocation by an amount substantially equal to its excess capacity, and notifying 316 the requestor of the allocation that the IPM has granted.

In some implementations in which the IPM has interrupted the current flowing though the IPM (or is not set to take on much or any computing load for its associated machine), such as in step 208 of FIG. 2, the IPM can make substantially its entire allocation available for other IPMs. For example, the IPM can be allocated 50 A but if the current path has been interrupted the IPM passes zero amps (or if a computing allocation system is unable to give the related device any tasks, the current will be very low), giving the IPM 50 A of excess capacity while the current is interrupted. The IPM can grant some or all of the excess capacity to other IPMs when requested to do so, thereby increasing the utilization of that available capacity. In some implementations, the IPM can negotiate an excess capacity before closing the breaker. For example, the IPM can be allocated 50 A but the IPM can request an additional 20 A. Once the 70 A excess capacity is reached, the IPM can close the breaker.

Figure 4:
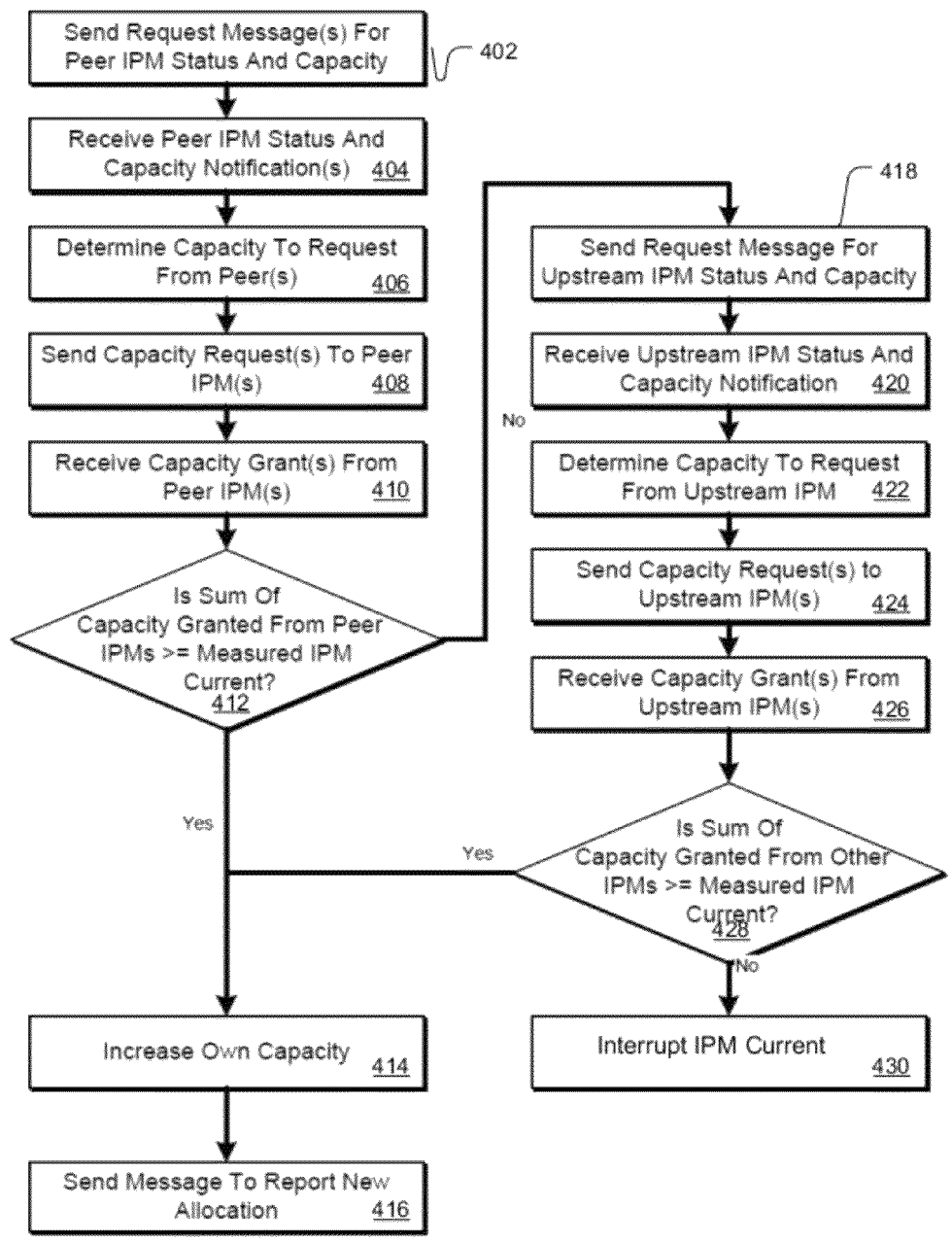
FIG. 4 is a flow diagram of an example capacity increase negotiation process.

FIG. 4 is a flow diagram of an example capacity increase negotiation process 400. In some implementations, the process 400 may be the capacity negotiation process illustrated by step 212 of FIG. 2. In general, in the process, an IPM that needs additional capacity can initial try to obtain the capacity from machines below it, or its same level. If sufficient capacity cannot be obtained from those levels, the IPM may request capacity from its parent IPM. If it can obtain capacity from the parent IPM, it may then relay that capacity to a child, such as a machine that needs to perform certain operations (e.g., the IPM can give the machine the go-ahead to perform certain computing operations that are expected to result in a need for the identified level of capacity). If the capacity is not available, it can notify the child to that effect, which may cause a machine to decline to take on certain computing operations that would have required the capacity. As one example, each rack in a data center may be assigned an IPM and each row of racks may be assigned one or more IPMs that are parents to the IPMs for the racks, and a particular transformed assembly may be assigned multiple rows that it serves. In such an example then, the communications described here may thus be between machines in a rack and an IPM for the rack, between peer IPMs for racks in a particular row, and between IPMs for the racks and the IPM or IPMs for the row in which the racks are located. Other peer and parent-child communications may also occur according to the hierarchical arrangement of a particular system.

The process 400 begins when an IPM sends a message 402 to request status and capacity data from one or more peer IPMs. The IPM receives 404 one or more status and capacity notifications from peer IPMs. For example, status information can include electrical current measurements, device ratings, present allocation settings, time-temperature trip profile information, load variability information, load trend information, and/or other information that can describe the status of an IPM.

The IPM determines 406 one or more capacity values to request from one or more peer IPMs and sends 408 requests for the determined capacity values to each peer IPM. In some implementations, the requesting IPM can determine 406 that a single peer IPM can allocate substantially all of the capacity needed by the requesting IPM. For example, the requesting IPM may need an additional 20 A of capacity, and a single peer IPM may have 25 A of excess capacity. The requesting IPM can request 408 substantially all of the needed additional 20 A from the single peer, leaving the peer with 5 A excess capacity.

In some implementations, the requesting IPM can determine 406 that two or more peer IPMs can jointly allocate substantially all of the capacity needed by the requesting IPM. For example, the requesting IPM may need an additional 35 A of capacity. A first peer IPM may have 30 A of excess capacity, and a second peer IPM may be 25 A of excess capacity. The requesting IPM can determine to 406 request 408 20 A from the first peer IPM and 15 A from the second peer IPM. The requested 408 allocations can be combined to satisfy the requesting IPM's needed 35 A, and leave the peer IPMs with 10 A of remaining excess capacity each.

The requesting IPM receives 410 capacity grant values from one or more peer IPMs. The requesting IPM then determines 412 if the sum of the capacities granted from the peer IPMs is greater than or equal to a target allocation value (e.g., the difference between the allocated and measured currents used in step 210 of FIG. 2). If the sum of the granted capacities is greater than or equal to the target allocation value, then the requesting IPM increases 414 its own allocation by the sum of the granted capacity values.

In some implementations, the requesting IPM can send 416 a message to update a database with the new allocation value. For example, the requesting IPM can notify an upstream IPM of the updated allocation value. In another example, the requesting IPM can notify an information management system (e.g. the information management system 122 of FIG. 1) to store or update information about the requesting IPM's status.

In some implementations, the sum of the granted capacities may be less that the current needed by the IPM. For example, the requesting IPM may request 15 A from its peers, but only receive 410 capacity grant values totaling 10 A. In some implementations, the requesting IPM may receive 410 no capacity grant values. For example, the IPM may receive no grants because the IPM has no peers, a communications link between the IPM and its peers may be unavailable, or none of the IPM's peers have excess capacity to grant. In these and other such examples, the IPM's sum of granted capacities can be considered to have the same effect as receiving 410 a grant value of 0 A.

If the sum of the granted capacities is not determined 412 to be greater than or equal to the target allocation value, then the requesting IPM sends 418 a capacity request message to an upstream IPM, and the requesting IPM receives 420 an IPM status and capacity notification from the upstream IPM. The requesting IPM can then determine 422 a capacity that it should request from the upstream IPM (though it can, in some implementations, make the request without first requesting the status and capacity of the upstream IPM. Upon determining the capacity to request, the IPM may then send 424 the request to its upstream IPM or IPMs, and may receive 426 in response one or more capacity grants from the upstream IPM or IPMs.

The requesting IPM then sums the total of the capacity grant values received 410 from peer IPMs with the capacity grant value received 420 from the upstream IPM or IPMs. If the total capacity is determined 428 to be greater than or equal to the additional current needed by the requesting IPM, then the IPM increases its own allocation 414 by the sum of the granted capacity values.

If the total capacity is determined 428 to be less than the additional current needed by the requesting IPM, then the IPM interrupts 430 the current path or the machines needed additional current decline to take on work that would generate the need for the extra current. In some implementations, the requesting IPM may not receive a response from the upstream IPM. For example, the requesting IPM may have no upstream IPM, or communications between the requesting and upstream IPMs may be interrupted. In these and other such examples, the lack of response from the upstream IPM can be considered to have the same effect as receiving 420 a grant value of 0 A.

In some implementations, the requesting IPM can send a notification message when the current path is interrupted 424. For example, the requesting IPM can send a notification message to the information management system, to technicians (e.g., via a paging system, email), or to other personnel and/or systems to alert them to the current interruption 424.

In some implementations, the requesting IPM can make substantially all of its allocation available to other IPMs when the current path is interrupted 424. For example, the requesting IPM can be configured with an allocation of 50 A when the current is interrupted 424. The interrupted 424 path can carry no current, therefore substantially all of the requesting IPM's 50 A allocation can be considered to be excess current, and the requesting IPM can offer substantially all of this excess current if/when requested (e.g., the request 308 of FIG. 3) by another IPM.

In some implementations, the IPM can reduce its own allocation to more closely match a measured current draw or a need inferred form present or anticipated computing tasks. For example, the IPM may be configured with an allocation of 40 A while the measured or inferred current flow is 10 A, resulting in 30 A of excess capacity. The IPM can reduce its own allocation to 10 A, 12 A, or another value that reduces the excess capacity while still satisfying the measured current draw. In another example, the IPM may be configured with an allocation of 40 A but has interrupted 424 the current path or reduced its computing load, resulting in an excess current of 40 A. The IPM can reduce its own power allocation to substantially zero amps to more closely match the zero measured current flow.

In some implementations, the IPM can reduce its own allocation upon request from a user or a peer, or do so automatically on a timed interval (e.g., every minute, hourly, daily). In some implementations, the IPM can automatically reduce its own allocation in response to an excess current threshold (either measured or inferred). For example, when measured current drops, excess current goes up. The IPM can be configured to automatically reduce its own allocation to the measured amount or to a reduced value that is higher than the measured current (e.g., to leave a 5% excess capacity margin).

In some implementations, a downstream IPM can notify an upstream IPM when the downstream IPM reduces its own capacity. For example, the upstream IPM can be allocated 50 A to supply a first downstream IPM's 25 A draw and a second IPM's 25 A draw. If the first IPM reduces its allocation by 10 A, it may notify the upstream IPM of the reduction, in essence, giving the upstream IPM 10 A of excess capacity. In some implementations, the upstream IPM can retain some or all of the excess capacity. For example, by retaining excess capacity, the upstream IPM may be able to more quickly redistribute allocations among peer IPMs when requested to do so.

In some implementations, the upstream IPM can detect excess capacity and request allocations from downstream IPMs so excess capacity is moved closer to the current source. For example, an upstream IPM can sense that it has 40 A of excess capacity (e.g., the downstream IPMs may not be drawing their allocated currents). The upstream IPM can request allocations from the downstream IPMs, and reduce its own allocation by an amount equal to or less than the sum of the granted allocations.

In some implementations, the upstream IPMs can reduce their own allocations to migrate excess capacity closer to the current source. For example, an IPM can reduce its own allocation, thereby allowing its parent IPM to reduce its own allocation, thereby allowing its grandparent IPM to reduce its own allocation, and so on. This reverse "trickle down" process can have the effect of pushing excess capacity closer to the current source and consolidating the excess capacity within IPMs that are closer to the top of an IPM hierarchy. In some implementations, by consolidating excess capacity closer to the current source, excess capacity originating in one branch of the IPM hierarchy and be re-allocated more quickly to IPMs in another branch.

Figure 5:
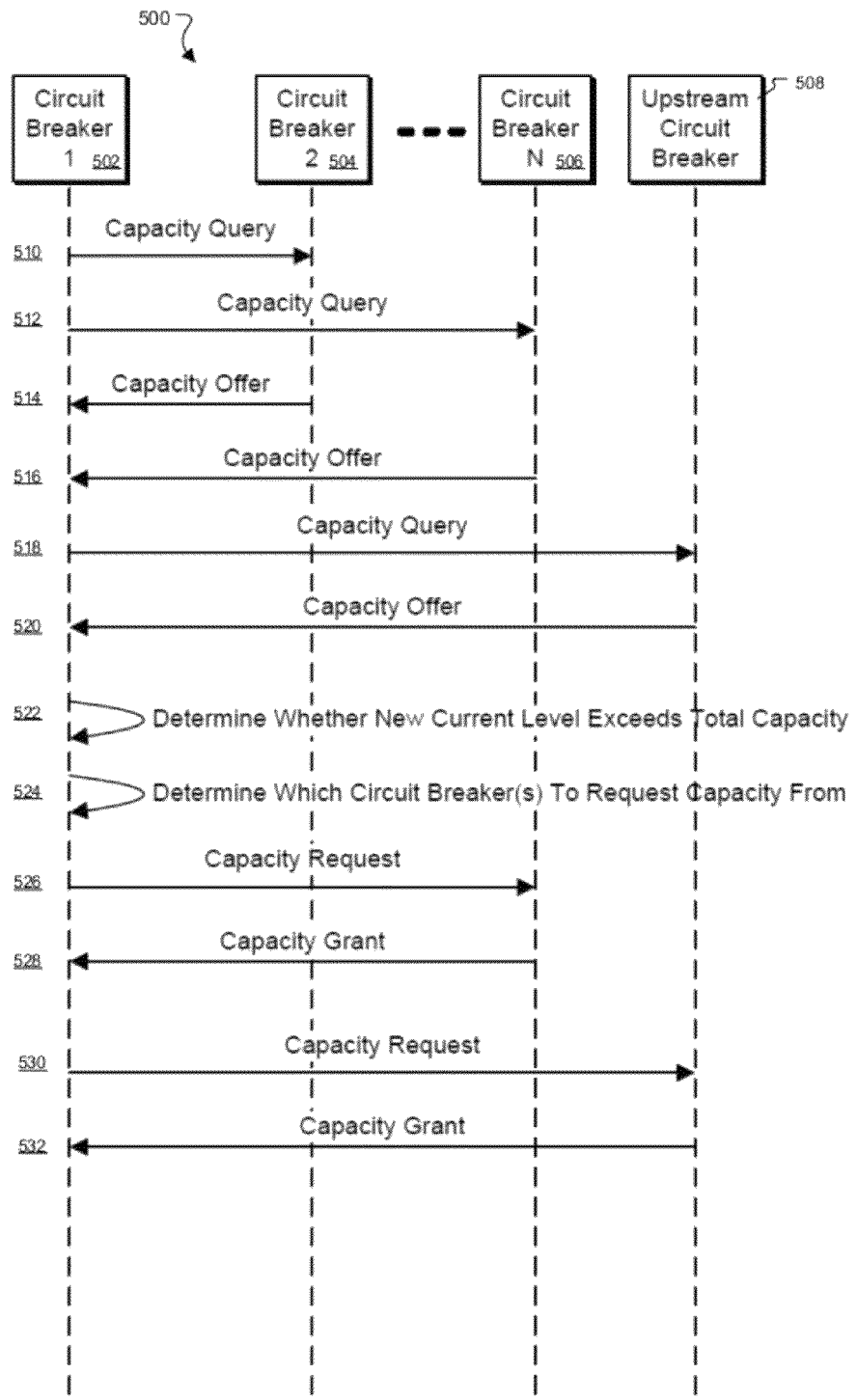
FIG. 5 depicts an example peer-to-peer interaction among intelligent protection modules for the dynamic allocation of power capacity to power nodes.

FIG. 5 depicts an example peer-to-peer interaction 500 among intelligent protection modules for the dynamic allocation of power capacity to power nodes. In some implementations, IPMs can negotiate distributions of power allocations in a peer-to-peer manner (e.g., without an information management system or central controller). In the illustrated example, a first peer IPM 502 needs to obtain additional power capacity allocations. The first peer IPM 502 sends a capacity query 510 to a second peer IPM 504, and sends a capacity query 512 to an Nth peer IPM 506. For the purposes of this example, the second peer IPM 504 and the Nth peer IPM 506 represent the first and last members of a collection of a plurality of peer IPMs (which can be a handful up to hundreds or thousands). In some implementations, the first peer IPM 502 can interact with any member of this collection in a manner substantially similar to the interactions it has with IPMs 504 and 506.

The second peer IPM 504 responds with a capacity offer 514. In some implementations, the capacity offer can be some or all of the second peer IPM's 504 excess capacity. The Nth peer IPM 506 also responds with a capacity offer 516 that represents an amount of excess capacity that the Nth peer IPM has available for allocation to other IPMs. In some implementations, the first peer IPM 502 can interact with the peer IPMs 504-506 to obtain power allocation it needs by obtaining allocations from its peers. In some implementations, by obtaining allocations from peers, the total current allocation given to the peer IPMs 502-506 can remain substantially unchanged.

The first peer IPM 502 also sends a capacity query 518 to an upstream IPM 508. In some implementations, the first peer IPM 502 can request a power allocation from the upstream IPM 508 when the peer IPMs 504-506 do not have enough excess capacity to satisfy the first peer IPM's 502 requirements. The upstream IPM 508 responds by sending a capacity offer 520 of its own.

The first peer IPM 502 uses the capacity offers 514-516 and 520 to determine 522 whether the new total current level exceeds total capacity. In some implementations, the total capacity can be the rated capacity of the first peer IPM. In some implementations, the total capacity can be the allocated and/or rated capacity of the upstream IPM 508. In some implementations, if the new current level exceeds the total capacity, then the first peer IPM 502 can interrupt its current path or take on fewer tasks to prevent an over-current condition.

The first peer IPM 502 uses the capacity offer 514-516 and 520 to determine 524 which of the IPMs 504-508 to request capacity from. In the illustrated example, the first peer IPM 502 determines 524 to request capacity from the Nth IPM 506 and the upstream IPM 508. The first peer IPM 502 sends a capacity request 526 to the Nth peer IPM 506, and receives a capacity grant 528 for a portion of the needed capacity. The first peer IPM 502 then sends a capacity request 530 to the upstream IPM 508 for substantially the remainder of the needed capacity, and receives a capacity grant 532.

Figure 6:
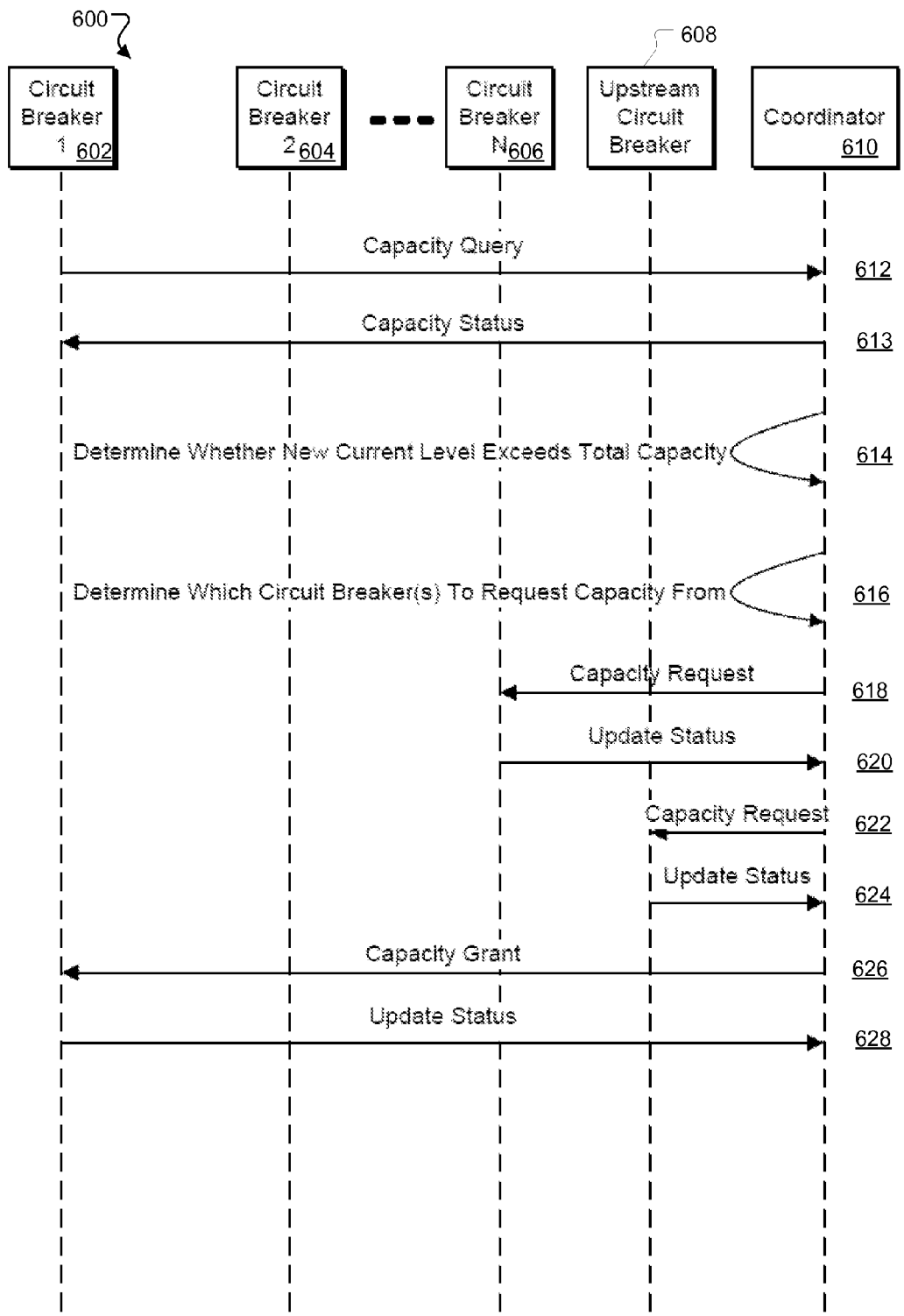
FIG. 6 depicts an example centralized interaction of intelligent protection modules for the dynamic allocation of power capacity to power nodes.

FIG. 6 is an example centralized interaction 600 of intelligent protection modules for the dynamic allocation of power capacity to power nodes. In some implementations, a coordinator in the form of database 610 can organize the distribution of power allocations among IPMs.

In the illustrated example, a first IPM 602 needs to obtain additional power capacity allocations. The first IPM 602 sends a capacity request 612 to the database 610. In some implementations, the database 610 may be, or be part of, the information management system 122 of FIG. 1. For example, in response to the capacity request 612 the database 610 can query an internal table of current measurement and/or status information obtained from a second IPM 604 though an Nth IPM 606, as well as an upstream IPM 608 which supplies power to the IPMs 602-606. Optionally, the database 610 may provide an indicator of capacity status 613, though such indicator may also be delayed until additional operations have occurred.

The database 610 determines 614 if the requested current level will exceed available capacity. For example, the capacity request 612 may be in excess of the upstream IPM's 608 device rating. The database 610 may deny the request 612 to prevent the upstream IPM 608 from an over-current condition.

If the capacity request 612 is determined 614 to be less than the available capacity, then the database 610 determines 616 which IPMs to request capacity allocations from. In the illustrated example, the database 610 determines 616 that allocations from the Nth IPM 606 and the upstream IPM 608 can be combined to grant the capacity request 612. The database 610 sends a capacity request 618 to the Nth IPM 606, and the Nth IPM 606 responds with a capacity grant 620 to update the database 610. The database 610 then sends a capacity request 622 to the upstream IPM 608. The upstream IPM 608 replies by sending a capacity grant 624 to the database 610.

In some implementations, capacity grants can cause the database 610 to update its records of IPM statuses. For example, receipt of the capacity grants 620 and 624 can trigger the database 610 to update its tables with the post-grant allocations of the IPM's 606 and 608.

In the illustrated example, the database 610 then sends a capacity grant 626 to the first IPM 602, and the first IPM 602 responds by sending a status update 628. In some implementations, the database 610 may use the status update 628 as a confirmation message that the capacity grant 626 was successfully received, and/or the database 610 may use the status update 628 to update its records of the first IPM's 602 status.

In some implementations, a distribution system for the dynamic allocation of power capacity to power nodes (e.g., the system 100 of FIG. 1) can switch among the interactions 500, 600, and/or other power allocation negotiation processes. For example, the system 100 can operate initially using the centralized interaction 600, but if the information management system 122 becomes unavailable (e.g., server malfunction, network outage, server maintenance downtime), the system can switch over to the peer-to-peer interaction 500 for continuing operations. When the information management system 122 becomes available again, the system 100 can revert back to the centralized interaction 600. An example combination of peer-to-peer and centrally coordinated interactions is described in the illustration and description of FIG. 7.

Figure 7:
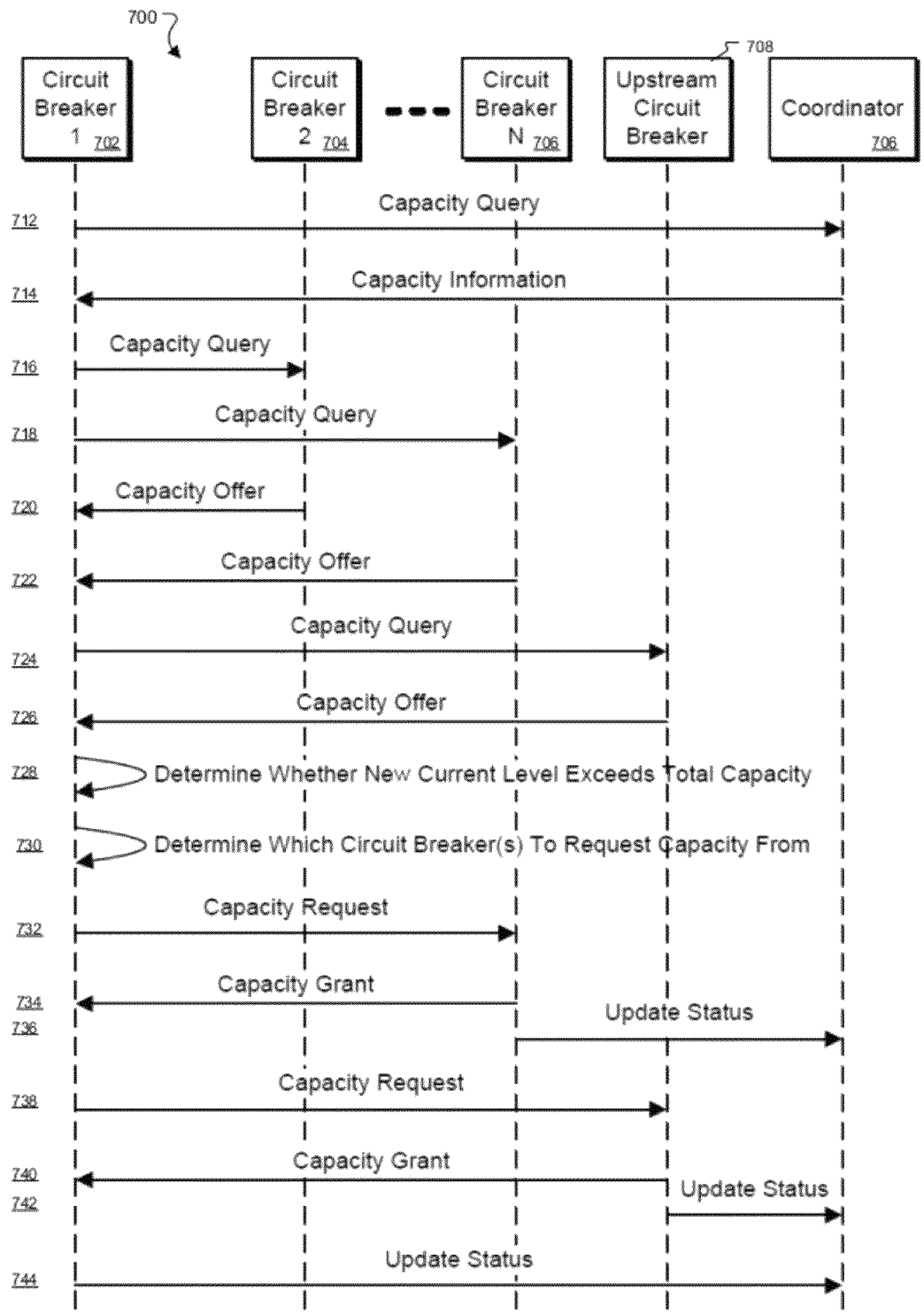
FIG. 7 depicts an example combination of centralized and peer-to-peer interaction of intelligent protection modules for the dynamic allocation of power capacity to power nodes.

FIG. 7 depicts a combination of centralized and peer-to-peer interactions 700 of intelligent protection modules for the dynamic allocation of power capacity to power nodes. In some implementations, initial requests for power allocations within a power distribution system (e.g., the system 100 of FIG. 1) may be directed to a database (e.g., the information management system 122) to determine which IPMs have excess capacity, and the requesting IPM can use that excess capacity information to directly query the IPMs that have capacity available for reallocation. In some implementations, the combined interactions 700 can provide the power distribution system with fault-tolerance against a centralized point of failure. For example, a failure of the database can cause the IPMs to interact in a peer-to-peer manner so allocation negotiation can continue until the failure is rectified.

In the illustrated example, a first IPM 702 needs to obtain additional power capacity allocations. The first IPM 702 sends a capacity query 712 to a database 710. The database 710 responds by sending capacity information 714 back to the first IPM 702. In some implementations, the capacity information may include information about the excess capacities of some, all, or none of the first IPM's 702 peers. For example, the capacity information 714 can include capacity information about every IPM connected to the first IPM (e.g., its parent IPM, child IPMs) as well as peer IPMs, such as a second IPM 704 through an Nth IPM 706. In another example, the capacity information 714 can include information about only those IPMs that the database 710 has identified as having excess capacity that the first IPM 702 can request.

The first IPM 702 sends a capacity query 716 to the second IPM 704, and sends a capacity query 718 to the Nth IPM 706. The second IPM responds with a capacity offer 720, and the Nth IPM 706 responds with a capacity offer 722. In the illustrated example, the capacity offers may not satisfy the first IPM's requirements, so a capacity query 724 is sent to the upstream IPM 708. The upstream IPM 708 responds by sending a capacity offer 726.

The first IPM 702 determines 728 whether the new current level exceeds a total capacity (e.g., the total available capacity, the device rating of the first IPM 702, the device rating of the upstream IPM 708). In some implementations, if the new current level is determined 728 to exceed the total capacity, then the first IPM 702 can interrupt the current path.

In some implementation, the first IPM 702 can use the capacity information to query only the IPMs 704-706 and 708 that have excess capacity available. In some implementations, the first IPM 702 may not receive the capacity information 714 (e.g., due to a communications failure or database outage), and respond by sending the capacity queries 716-720 and 724 to all the connected and peer IPMs 704-706 and 708.

The first IPM 702 then determines 730 which of the IPMs 704-706 and 708 to request capacity from. In the illustrated example, the first IPM 702 has determined that it will attempt to negotiate with the Nth IPM 706 and the upstream IPM 708 to obtain the additional capacity it needs. A capacity request 732 is sent to the Nth IPM, and a capacity grant 734 is returned. The Nth IPM 706 also sends a status update 736 to the database 710 to notify the database 710 of the Nth IPM's 706 reduced allocation.

A capacity request 738 is sent to the upstream IPM 708, and a capacity grant 740 is returned. The upstream IPM 708 also sends a status update 742 to the database 710 to notify the database 710 that the upstream IPM 708 has changed its allocation. The first IPM 702 then sends the database 710 a status update 744 of its own to notify the database 710 of the first IPMs increased allocation.

Figure 8A:
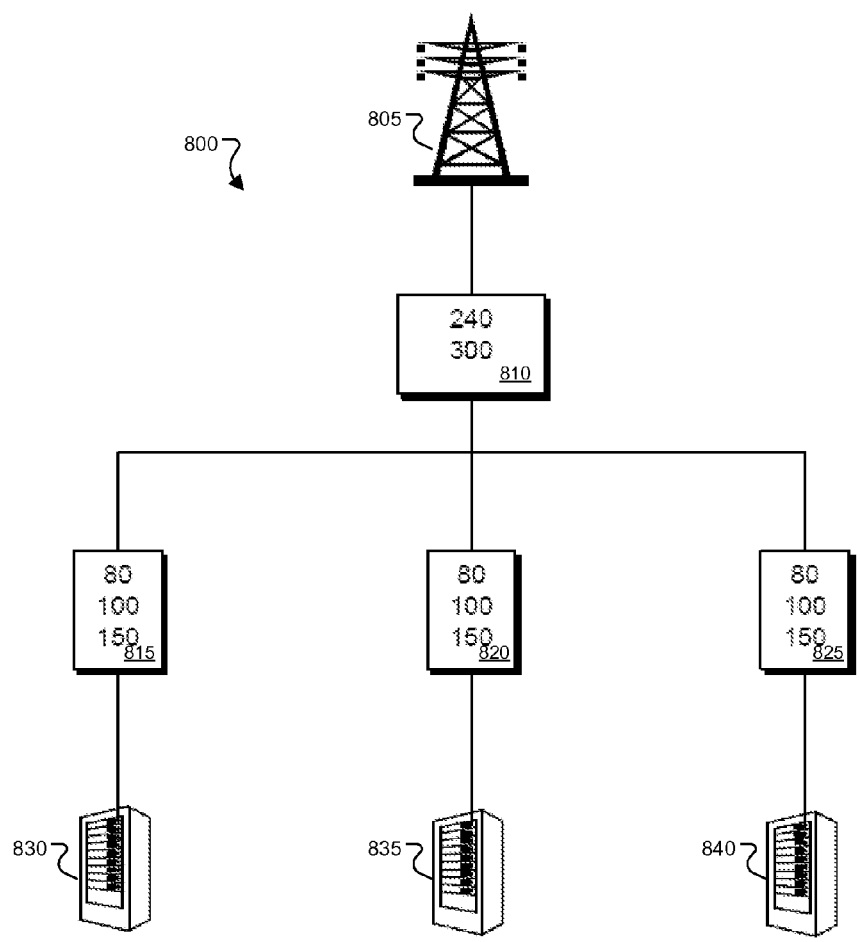
FIGS. 8A and 8B show an example power distribution system that dynamically allocates power due to changes in power load.
Figure 8B:
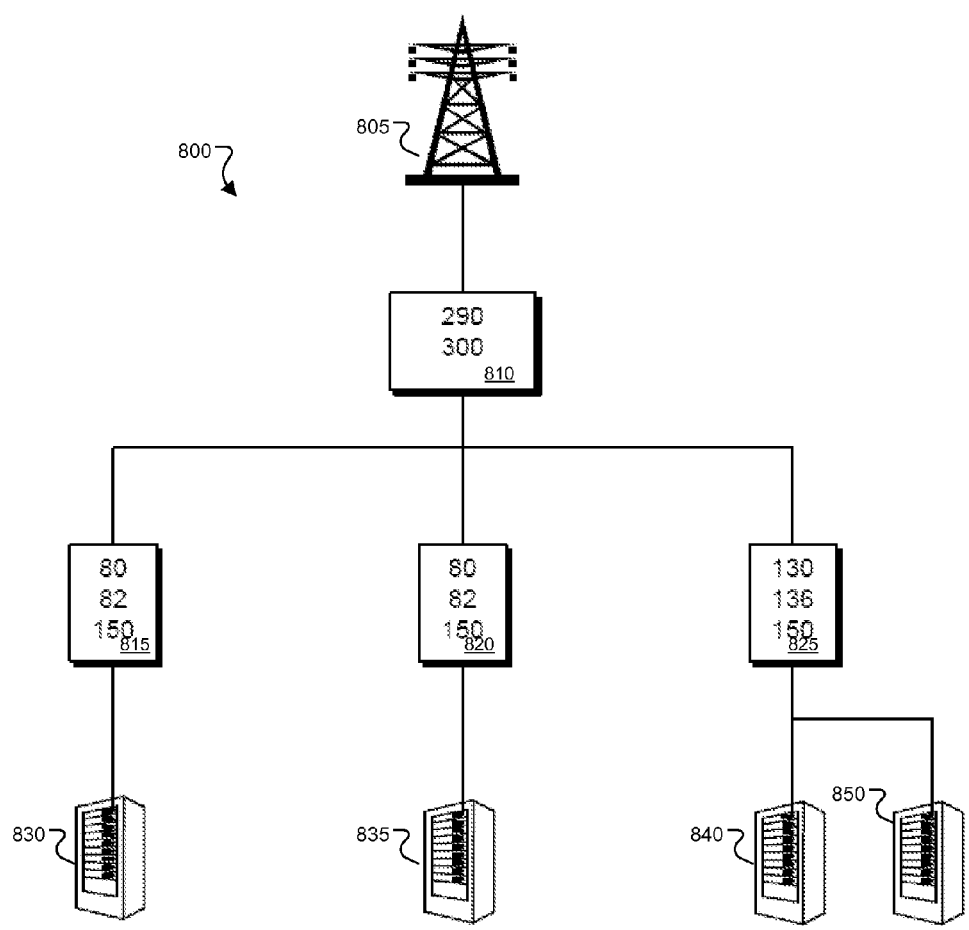

FIGS. 8A and 8B show an example power distribution system that dynamically allocates power due to changes in power load. FIG. 8A shows an example system 800 that receives power from a utility 805. In the illustrated example, the utility 805 is capable of supplying 300 A to the system 800. An over-current protection device 810 limits and distributes the power to an IPM 815, an IPM 820, and an IPM 825. The IPM 815 provides over-current protection to an electrical load 830 (e.g., a rack of computing equipment). Likewise, the IPM 820 protects an electrical load 835, and the child IPM 825 protects an electrical load 840. As noted above, demand-side management may be provided in a similar manner by having an application operating on the relevant computing devices limit the amount of work the devices will perform, and thus indirectly, the amount of electrical power they will require.

In the illustrated example, the IPMs 815-825 each pass 80 A, are allocated 100 A, and have a device rating of 150 A apiece. In this configuration, the IPMs 815-825 are allocated a total of 300 A, and pass a total of 240 A to the electrical loads 830-840. The over-current protection device 810 has a device rating of 300 A, which both satisfies the total amperage allocated to the IPMs 815-825 and limits the draw to the 300 A limit that the utility 805 can provide. The over-current protection device 810 passes the 240 A total drawn by the electrical loads 830-840. Likewise, the amount of current draw can be regulated in manners like those discussed above.

FIG. 8B shows the system 800 with an additional electrical load 850. The additional electrical load 850 is connected to the IPM 825 in parallel with the electrical load 840, and draws an additional 50 A.

In the illustrated example, the IPM 825 now needs to pass a total of 130 A to satisfy the current draw of the electrical loads 840 and 850. The 130 A is in excess of the 100 A originally allocated to the IPM 825 in FIG. 1, but is still below its own 150 A device rating. The IPM 825 negotiates with the IPMs 815 and 820 to obtain allocations of the IPMs' 815 and 820 excess capacity.

The IPMs 815 and 820 reduce their own allocations by 18 A apiece, leaving 2 A of excess capacity remaining for each.

In some implementations, the IPMs 815-825 can request excess capacity. As in the illustrated example, the IPM 825 needed to obtain a total of 30 A from the IPMs 815 and 820 to satisfy the total 130 A draw of the electrical loads 840 and 850. But instead, the IPM 825 requested and obtained a total of 36 A from the IPMs 815 and 820. In some implementations, an IPM can request allocations of capacity to create a reserve of excess capacity. For example, by requesting 6 A more than the required 130 A draw, the IPM 825 can hold the 6 A as a buffer against current spikes that may exceed the 130 A draw and cause the IPM 825 to interrupt the circuit.

In some implementations, the IPMs 815-825 can withhold excess capacity from being reallocated. As in the illustrated example, the IPMs 815 and 820 originally had 20 A of excess capacity each, but allocated 18 A each to the IPM 825, leaving 2 A of excess capacity behind for each of the IPMs 815-820. In some implementations, the IPMs 815-825 can withhold excess capacity to maintain a reserve of excess capacity. For example, by withholding 2 A while allocating capacity to the IPM 825, the IPM 815 can maintain a margin of safety against current spikes that may come from the electrical load 830.

FIGS. 9A-9D show an example dynamic power allocation among a hierarchy 900 of power distribution nodes. In general, allocation requests by lower-level IPMs in one branch of an IPM hierarchy system can be supplied by excess capacity in IPMs in another branch through a series of allocation negotiations among the nodes in a power distribution system.

Figure 9A:
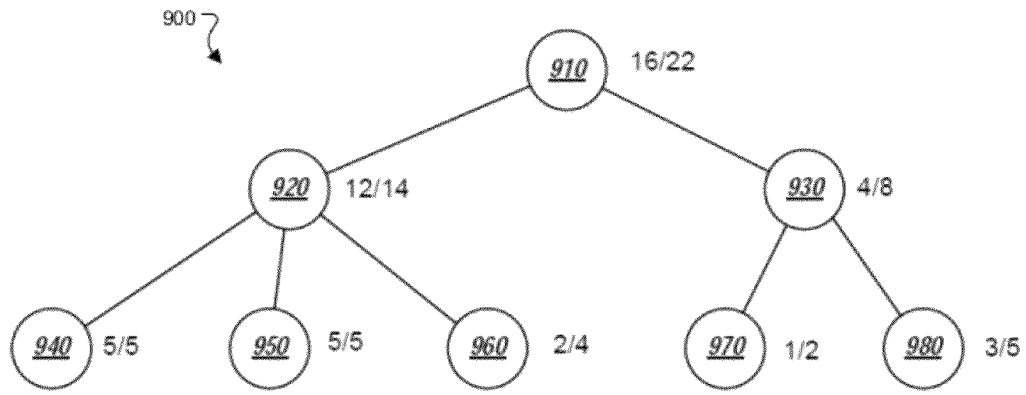
FIGS. 9A-9D show an example dynamic power allocation among a hierarchy of power distribution nodes.

FIG. 9A shows the hierarchy 900 in an initial state. The hierarchy 900 includes a top-level IPM 910 that protects and distributes power to a mid-level IPM 920 and a mid-level IPM 930. The mid-level IPM 920 protects and distributes power to a base-IPM 940, a base-IPM 950, and a base-IPM 960. The mid-level IPM 930 protects and distributes power to a base IPM 970 and a base IPM 980.

Each of the IPMs 910-980 has a corresponding measured current and allocation. For example, the top-level IPM 910 is passing 16 A out of a 22 A allocation. Each of the IPMs 910-930 distributes power to downstream IPMs, and is configured to allocate the power needed by downstream IPMs. For example, the base-level IPMs 940-960 draw a total of 12 A, and the mid-level IPM 920 passes the 12 A of an allocated 14 A. In another example, the mid-level IPMs 920 and 930 draw a combined total of 16 A through the top-level IPM 910.

Figure 9B:
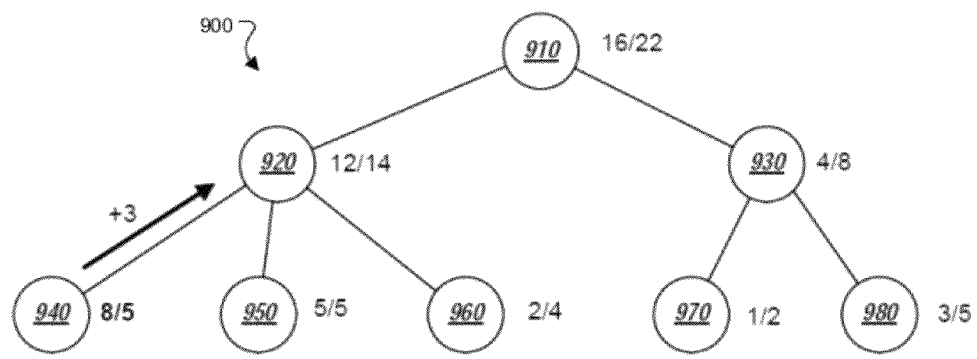

FIG. 9B shows that the base-level IPM 940 is experiencing an electrical current draw of 8 A, which is 3 A over the base-level IPM's 940 present allocation. The base-level IPM 940 sends a message to the mid-level IPM 920 to request a 3 A allocation. Such a message can be sent when such a draw is sensed, or could also be sent when the machine for IPM 940 is assigned to soon receive certain tasks that are expected, when they are executed, to cause the IPM 940 to draw that power level.

Figure 9C:
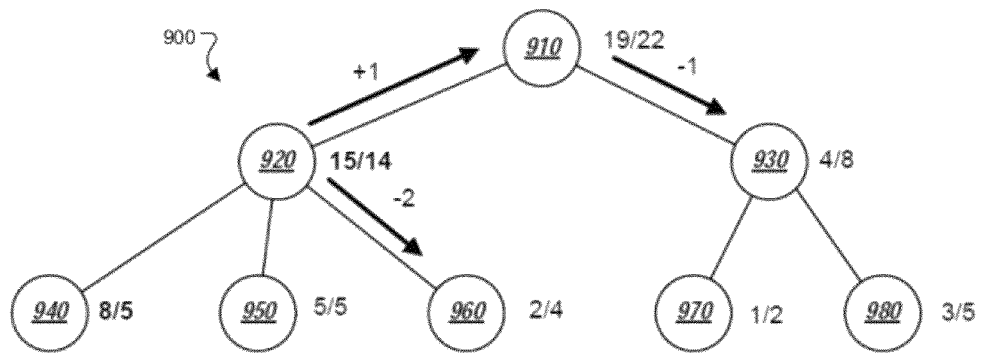

FIG. 9C shows that the current passing through the mid-level IPM 920 has been pushed to 15 A, or 1 A over its present allocation. The mid-level IPM 920 responds by requesting a reallocation of power from its downstream, base-level IPM 960 which has 2 A of excess capacity. The mid-level IPM 920 also requests a 1 A allocation from the top-level IPM 910. In some implementations, the mid-level IPM 920 can reallocate capacity allocations among the peer, base-level IPMs 940-960 before requesting an additional power allocation from the top-level IPM 910. For example, by reallocating power among the peer, base-level IPMs 940-960, the mid-level IPM 920 can increase the utilization of current presently allocated to the mid-level IPM 920, and reduce the amount of additional allocation that may be needed from the top-level IPM 910.

In some implementations, an upstream IPM can reallocate power among downstream IPMs to prevent an over-allocation of the upstream IPM. For example, the top-level IPM 910 can receive its power from a source that has a maximum output of 22 A. The top-level IPM 910 can have its allocation set to match the 22 A maximum to prevent the IPMs 920-980 from drawing more current than the 22 A source can supply.

In another example, in order to satisfy the 15 A needs of base-level IPMs 940-960, the mid-level IPM 920 needs to increase its allocation to 15 A or higher. While the total current draw through the top-level IPM 910 is now 19 A, and below the 22 A allocation, the 15 A allocation needed by the mid-level IPM 920 combined with the 8 A allocation given to the mid-level IPM 930 will total a 23 A allocation, which is higher than the 22 A allocation of the top-level IPM. The top-level 910 prevents an over-allocation by requesting that the mid-level IPM 930 reduce its allocation by 1 A. In some implementations, the mid-level IPM 930 can query downstream IPMs (e.g., the IPMs 970-980) to recover excess downstream capacity. For example, the mid-level IPM 930 can request a 1 A allocation from the base-level IPM 980. The base-level IPM 980 can respond by reducing its own allocation, which can reduce the amount of current that is needed at the mid-level IPM 930 by a substantially similar amount. By reallocating 1 A from the base-level IPM 980, and in turn reducing the mid-level IPM 930 allocation by 1 A, the theoretical draw on the top-level IPM 910 can be reduced from 23 A down to 22 A.

Figure 9D:
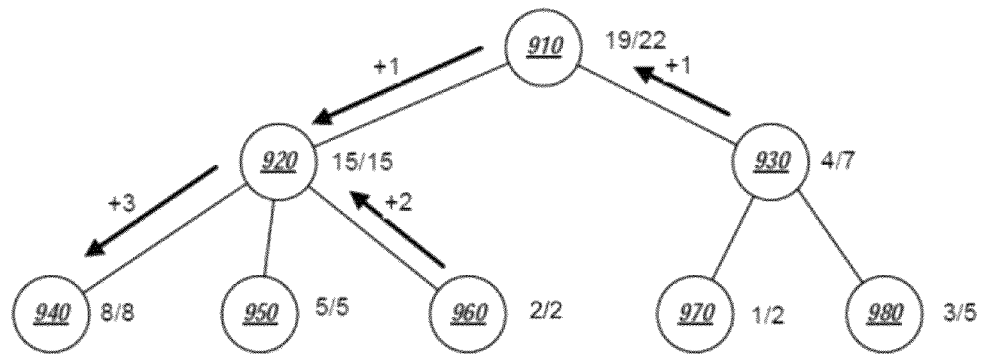

FIG. 9D shows that the base-level IPM 980 and the mid-level IPM 930 have reduced their own allocations by 1 A, and have granted that 1 A to the top-level IPM 910. The top-level IPM 910 re-allocates the 1 A to the mid-level IPM 920, which allows the IPM 920 to raise its own allocation by 1 A to a 15 A total. The reallocated 1 A is combined with the 2 A granted by the base-level IPM 960 to create a 3 A allocation that is then granted to the base-level IPM 940, allowing the base-level IPM to raise its allocation to 8 A.

Figure 10:
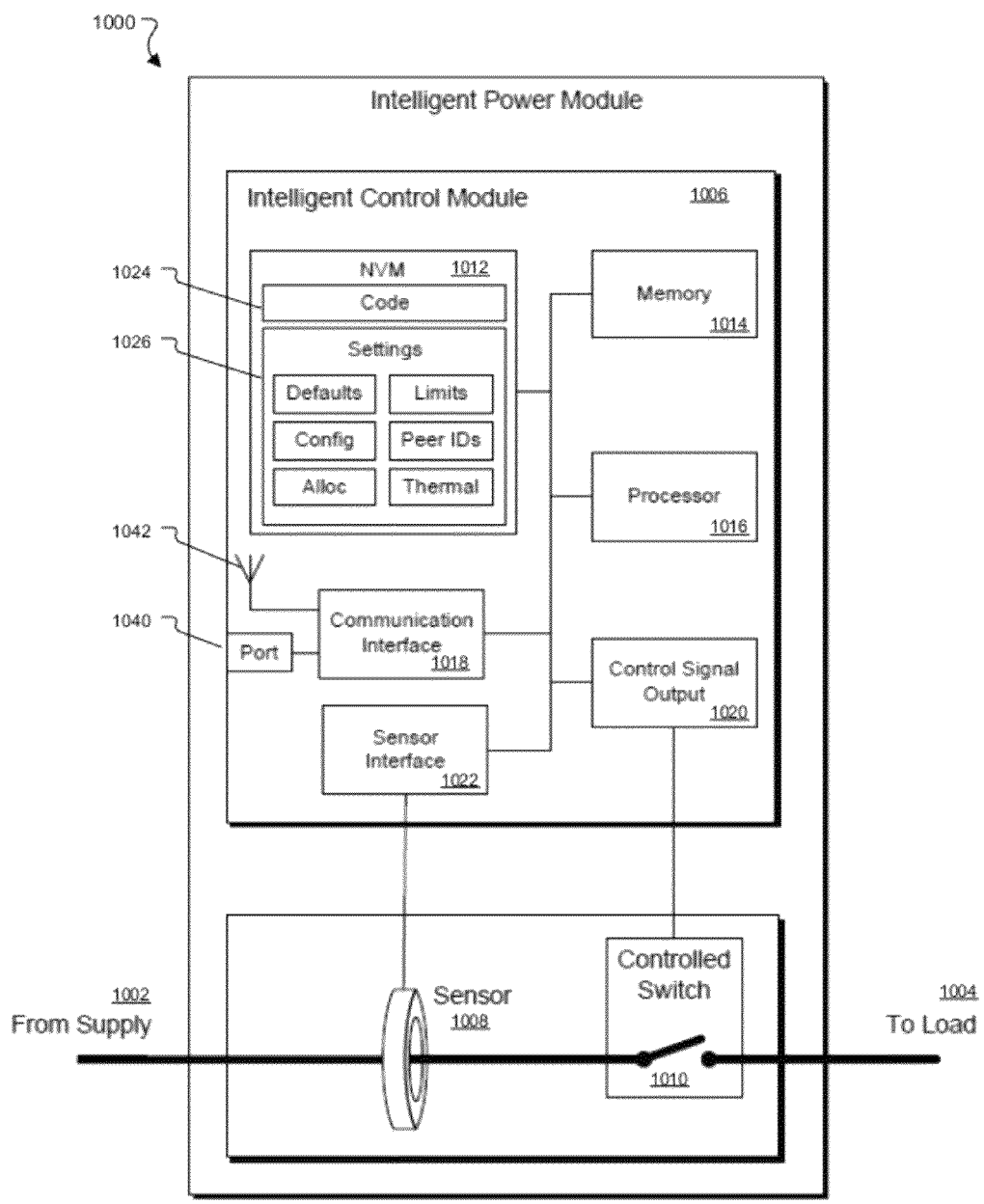
FIG. 10 shows a block diagram of an intelligent protection module.

FIG. 10 shows a block diagram of an IPM 1000 implemented as a hardware component. In some implementations, the IPM 1000 can be the IPMs 110a, 110b, 118a, and/or 118b of FIG. 1. The IPM 1000 receives electrical current from a supply 1002, and limits the amount of current that passes to an electrical load 1004. As noted above, leaf node IPMs can also be implemented as daemons that execute on the computing devices in a system that are themselves the main sources of current draw.

The IPM 1000 includes an intelligent control module 1006, a current flow sensor 1008, and a controlled switch 1010. In some implementations, the sensor 1008 can be a transformer, a Hall Effect device, a resistor connected to a voltmeter, or other device that can output a signal that is proportional to or otherwise indicative of the level of current flowing through a conductor. In some implementations, the controlled switch 1010 can be an electromechanical or solid state relay, a remotely controllable circuit breaker, or other device that can be controlled remotely to interrupt a current path.

In general, the intelligent control module 1006 uses the sensor 1008 to measure the amount of current passing through the IPM 1000. The intelligent control module 1006 compares the measured current against a power allocation value and controls the controlled switch 1010 to optionally interrupt the current flowing to the electrical load 1004. In some implementations, the IPM 1000 can communicate with other IPMs or an information management system to raise and/or lower its allocation in response to changes in sensed current flows, requests from other IPMs and/or the information system, and/or other conditions that can cause an IPM to change its power allocation.

The intelligent control module 1006 includes a non-volatile memory (NVM) 1012, a memory 1014, a processor module 1016, a communications interface module 1018, a control signal output 1020, and a sensor interface 1022. The processor module 1016 accesses the NVM 1012 to read and execute a set of computer code modules 1024. The set of computer code modules 1024 includes a main code module, an allocation increase negotiation module, and an allocation decrease negotiation module. Example processes performed by the code modules 1024 are discussed in further detail in relation to FIGS. 2-4.

The processor module 1016 can also read a collection of settings 1026. The settings 1026 includes a collection of default settings, a collection of limit values, a collection of configuration settings, a collection of peer identities, an allocation value, and a collection of thermal performance data.

The collection of default settings includes values that the processor 1016 can use to run the code 1024 at startup of the IPM 1000. For example, the default settings can include a default identity of the IPM 1000, a default allocation value, and/or other information that can be used by the code 1024 if some or none of the collections 1034-1044 have been configured.

The collection of limit values includes values that describe limits such as the IPM's 1000 device rating, a minimum current flow rating, or other values that describe the performance and/or tolerance limits of the IPM 1000.

The collection of configuration values includes values such as network addresses of the IPM 1000, the information management system, or other devices. The configuration values can also include timeout, and/or device rating values (e.g., the maximum current rating of the IPM 1000). For example, the configuration values can include a value that describes the interval that the IPM 1000 should wait for a response to messages sent to other IPMs and/or the information management system before timing out. In some implementations, the IPM 1000 can time out to avoid blocking a process in the code 1024. For example, the IPM 1000 can send capacity requests and then wait five seconds for the responses to come back before proceeding. In some implementations, the IPM 1000 can time out to detect that the information management system is unavailable. For example, the IPM 1000 can send an allocating request to the information management system of a centrally-coordinated power distribution system and wait ten seconds for a response before switching over to a peer-to-peer allocation negotiation process.

The collection of peer identities includes information that identifies other IPMs that are in electrical proximity to the IPM 1000. For example, the collection of peer identities can include the names and/or network addresses of the IPM that is upstream of the IPM 1000 (e.g., the parent IPM), IPMs that are downstream from the IPM 1000 (e.g., child IPMs), and/or other IPMs that derive power from the upstream IPM (e.g., sibling IPMs).

The allocation value includes a value that represents the amount of current that the IPM 1000 is allocated to pass. For example, the allocation value can be set to 100 A. When the amount of current passing through the IPM 1000 is sensed to be equal to or greater than the allocated amount, the IPM 1000 can negotiate for additional allocations and/or interrupt the current flow. In some implementations, the code 1024 can be configured to negotiate for additional allocations when the measured current is anticipated to reach the allocated value. For example, the IPM 1000 can pass 90 A of a 100 A allocation, but successive current flow measurements indicate that current usage is rising at a rate of 1 A per second. The processor 1016 and the code 1024 can be used to determine that the IPM 1000 has approximately ten seconds to preemptively request additional allocations in an attempt to avoid a possible over-current condition.

The collection of thermal performance data describes the thermal performance of the controlled switch 1010 at various amperage levels. In some implementations, the controlled switch 1010 can be run at or beyond its device rating for short periods of time without incurring damage due to the heat caused by excessive currents. For example, the controlled switch 1010 can be run indefinitely at 0% to 100% of its rating, at 105% for one second, at 110% for 0.5 second, and 115% for 0.1 second.

In some implementations, the thermal performance data can be or include a mathematical formula or model that can be used by the code 1024 to calculate how the IPM 1000 can tolerate short over-current conditions without incurring damage. In some implementations, the thermal performance data can be a lookup table of amperage and time data. For example, the thermal performance of the controlled switch 1010 can be estimated or measured empirically. In another example, the thermal performance of the controlled switch 1010 can be supplied by the manufacturer of the controlled switch 1010. Examples of the thermal performance data are discussed in additional detail in the description of FIG. 11.

The sensor interface 1022 receives signals from the sensor 1008 and provides an output that can be used by the processor 1016. In some examples, the sensor interface 1022 can be or include an analog to digital converter. For example, the sensor 1008 can output an analog signal that is proportional to the current that passes through the sensor 1008. The sensor interface 1022 converts the analog signal to a digital value that can be used by the processor 1016.

The control signal output 1020 connects the intelligent control module 1006 to the controlled switch 1010. In some implementations, the control signal output 1020 can respond to a command or signal from the processor module 1016 and output a corresponding command or signal to open and/or close the controlled switch 1010. For example, the control signal output 1020 can be a protocol converter that converts messages between the processor module's 1016 format and a communications format to which the controlled switch 1010 is configured to respond (e.g., RS232, RS422, RS485, USB, Ethernet, CAN, PROFIBUS, DeviceNet). In some implementations, the control signal output 1020 can provide a digital output that can trigger the controlled switch 1010. For example, the control signal output 1020 can receive a command from the processor module 1016 and respond by outputting a DC voltage that actuates a relay within the controlled switch 1010.

The communication interface module 1018 converts communications between a format that the processor module 1016 can use and a protocol and/or medium that can be used to communicate with other IPMs, the information management system, a user terminal, and/or other external devices. For example, the communication interface module 1018 can be a transceiver for wired and/or wireless Ethernet, power line communications, Bluetooth, ZigBee, RS232, RS422, RS485, USB, CAN, PROFIBUS, DeviceNet, and/or other protocols. The communications interface module 1018 is communicably connected to a communications port 1040 and/or an antenna 1042 that can be used to connect the communication interface module 1018 to wired and/or wireless communications media.

Figure 11:
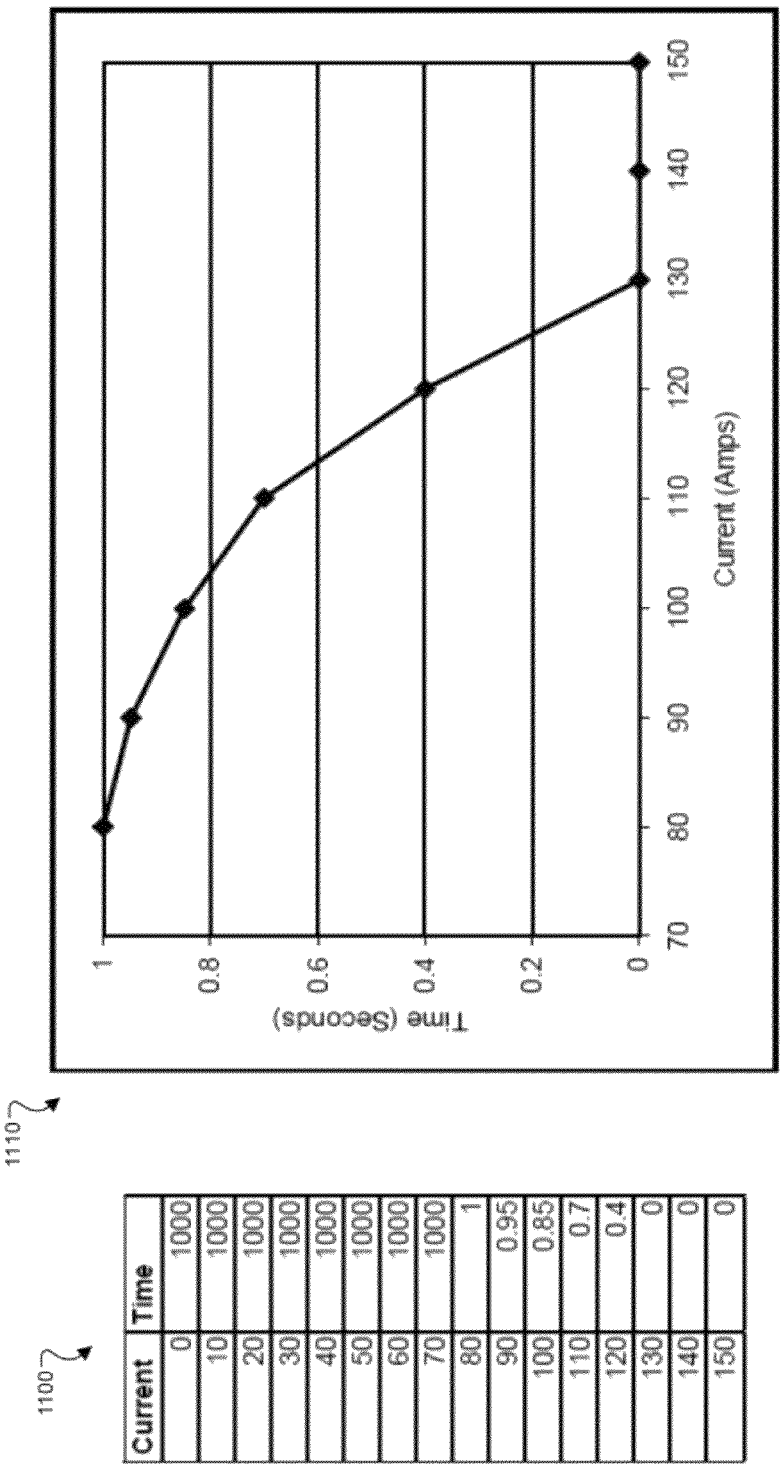
FIG. 11 shows a table and chart of an example of overcurrent tolerance values.

FIG. 11 shows a table 1100 and a chart 1110 of an example of over-current tolerance values. In general, electrical conductors can be driven beyond their rated continuous capacities for short periods of time substantially without experiencing adverse effects (e.g., overheating of an electrical conductor, tripping the contacts of a circuit breaker). For example, a circuit breaker can be rated to conduct 10 A of DC current continuously without tripping, but it may also be able to conduct 20 A for a tenth of a second, and/or 15 A for half a second. In general, the higher the over-current, the shorter the period of time that the over-current can be tolerated.

The table 1100 of over-current tolerance values includes a collection of time and current pairs that can describe the over-current behavior of an IPM such as the IPMs 110*a*, 110*b*, 118*a*, or 118*b* of FIG. 1, or the IPM 1000 of FIG. 10. In some implementations, the time and current pairs describe a range of current values over which the IPM can conduct substantially continuously, a range of current values over which the IPM will interrupt current flow substantially immediately, and a range of increasing current and decreasing time values that describe the durations that the IPM can conduct over-currents before interrupting current flows.

For example, the table 1100 shows that in the range of currents from 0 A to 80 A the IPM is configured to operate substantially continuously (CONT), and to trip substantially immediately for amperages of 130 A or more. In the range from 80 A to 130 A, the time and current value pairs describes the varying amounts of time that the IPM can tolerate over-currents before interrupting the current carrying circuit. For example, the table 1100 shows that the IPM is configured to conduct 90 A for 0.95 seconds before tripping. The IPM is also configured to conduct 120 A for 0.4 seconds before tripping.

In some implementations, the over-current tolerance values can be calculated by a mathematical formula or model. In some implementations, the over-current values between explicitly described values can be calculated from the explicitly described values. For example, the chart 1110 shows that by interpolating the explicitly described time values for 120 A and 130 A, an over-current of 125 A can be tolerated for 0.2 seconds. In another example, a "best fit" curve can be calculated for the current and time pairs, and can be used to calculate the amount of time the IPM can conduct various amperages before interrupting the circuit.

Figure 12:
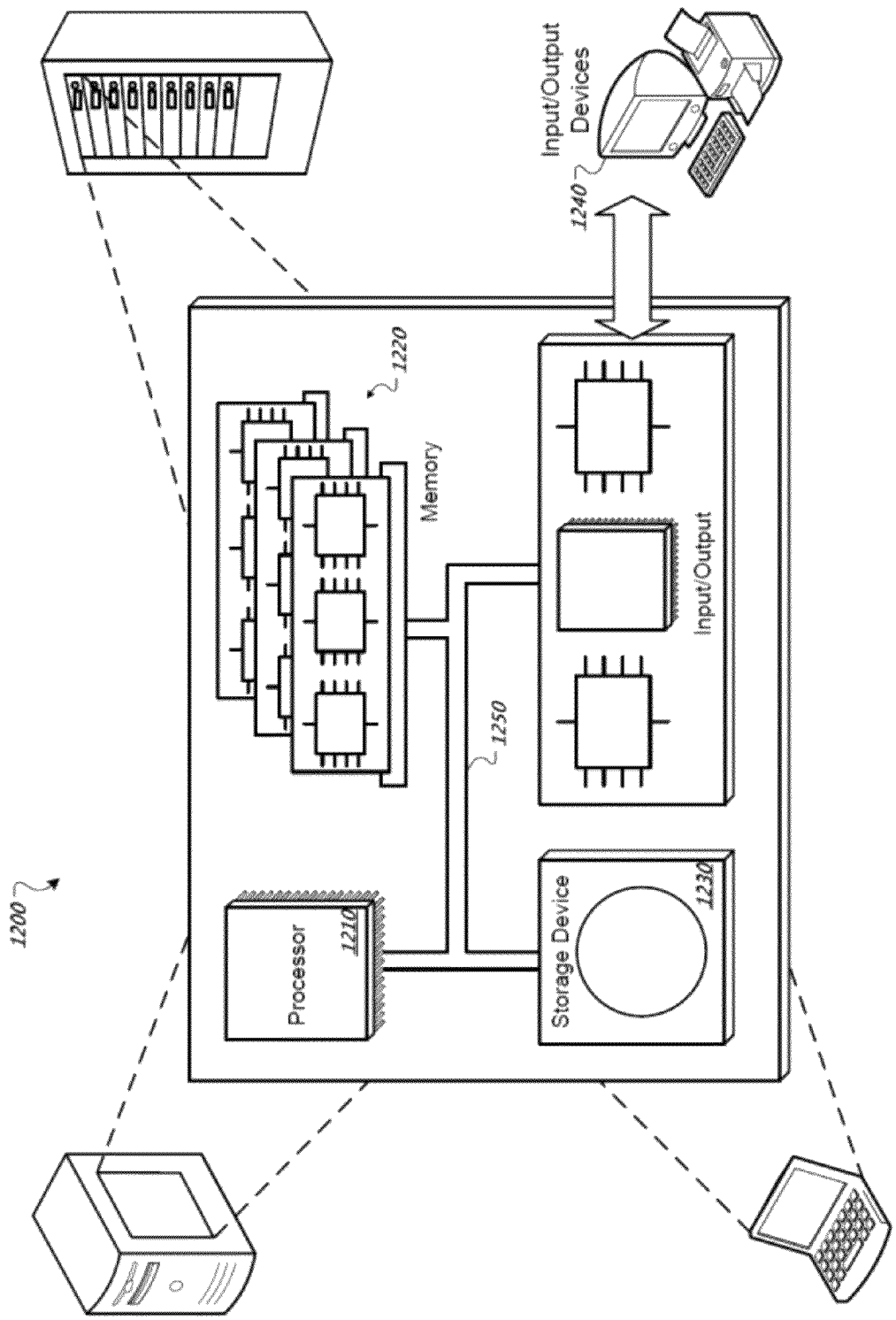
FIG. 12 is a schematic diagram of an example of a generic computer system.

In some implementations, the IPM can be configured with an allocation that can be represented by collections of over-current tolerance values rather than a single point. For example, when the IPM discussed in FIG. 4 determines 406 one or more capacity values to request from one or more peer IPMs, the values can be a collection of time and current pairs such as those illustrated in the table 1100. FIG. 12 is a schematic diagram of an example of a generic computer system 1200 that can be implemented with IPMs are other apparatuses described above so as to carry out the various processes and operations described above. The system 1200 can be used for the operations described in association with the process 200 according to one implementation. For example, the system 1200 may be included in either or all of the IPMs 110*a*, 110*b*, 118*a*, and 118*b*, and/or the information management system 122.

The system 1200 includes a processor 1210, a memory 1220, a storage device 1230, and an input/output device 1240. Each of the components 1210, 1220, 1230, and 1240 are interconnected using a system bus 1250. The processor 1210 is capable of processing instructions for execution within the system 1200. In one implementation, the processor 1210 is a single-threaded processor. In another implementation, the processor 1210 is a multi-threaded processor. The processor 1210 is capable of processing instructions stored in the memory 1220 or on the storage device 1230 to display graphical information for a user interface on the input/output device 1240.

The memory 1220 stores information within the system 1200. In one implementation, the memory 1220 is a computer-readable medium. In one implementation, the memory 1220 is a volatile memory unit. In another implementation, the memory 1220 is a non-volatile memory unit.

The storage device 1230 is capable of providing mass storage for the system 1200. In one implementation, the storage device 1230 is a computer-readable medium. In various different implementations, the storage device 1230 may be a floppy disk device, a hard disk device, an optical disk device, or a tape device.

The input/output device 1240 provides input/output operations for the system 1200. In one implementation, the input/output device 1240 includes a keyboard and/or pointing device. In another implementation, the input/output device 1240 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device or in a propagated signal, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Typical elements of a computer may include a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (applicationspecific integrated circuits). To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. In some implementations, an IPM may use a tiered-requests approach to request excess capacity allocation as it approaches full utilization of its present capacity allocation. For example, if the IPM capacity is from 85%-90%, a request may be sent with a low-priority code. Likewise, if an IPM capacity is from 90%-95%, a request may be sent with a medium-priority code. Similarly, if an IPM capacity is from 95%-100%, a request may be sent with a high-priority code. These codes may be used by other IPMs in the system or by an information system to determine whether or not to grant a request.

A number of embodiments have been described. Nevertheless, it will be understood that various modifications may be made. For example, advantageous results may be achieved if the steps of the disclosed techniques were performed in a different sequence, if components in the disclosed systems were combined in a different manner, or if the components were replaced or supplemented by other components. Accordingly, other embodiments are within the scope of the following claims.

What is claimed is:

1. A computer-implemented method of allocating power to computing machines, the method comprising:
    receiving, at a computing allocation system and from a plurality of computing machines, electronic communications comprising:
        i) a first request, comprising a power value, that represents a first power allotment that is expected to be used by a first computing machine during a predetermined period of time; and
        ii) one or more first priority values that represent priorities of one or more tasks expected to be executed by the first computing machine during the predetermined period of time;
    determining, using a scoring function at the computing allocation system, a plurality of scores associated with the plurality of computing machines, the scoring function comprising the first priority values, where the plurality of scores are maintained in an ordered electronic list;
    granting, with the computing allocation system and to the plurality of computing machines, power allotments for the plurality of computing machines in accordance with a comparison of the determined scores for the plurality of computing machines, a higher score corresponding to a relatively larger power allotment for a computing machine, the power allotments granted based on a determination of an appropriate position within the ordered electronic list of scores for a determined first score and placing the determined first score within the ordered electronic list of scores at the appropriate position;
    sending responsive electronic communications to the plurality of computing machines, the responsive electronic communications formatted to cause particular ones of the plurality of computing machines to take a power allotment in accordance with their granted allotments;
    determining, by at least one particular computing machine of the plurality of computing machines, an excess power capacity; and
    reporting, by the at least one particular computing machine, the excess power capacity,
    wherein the computing allocation system controls power allocation to the plurality of computing machines repeatedly at a periodic frequency.

2. The method of claim 1, wherein one or more computing machines of the particular ones of the plurality of computing machines send more electronic communications to the computing allocation system after determining that the one or more tasks expected to be executed during a predetermined period of time will require more power than an available amount of power assigned to the one or more computing machines of the particular ones of the plurality of computing machines.

3. The method of claim 2, wherein the one or more computing machines of the particular ones of the computing machines limit their power consumption to an available amount of power assigned to the one or more computing machines of the particular ones of the computing machines while their requests for a power allotment are pending at the computing allocation system.

4. The method of claim 1, further comprising maintaining, at the computing allocation system, an electronic reserve list of underutilized computing machines that are each operating below an initial respective power limit assigned to the respective underutilized computing machine.

5. The method of claim 4, wherein the computing allocation system sends subsequent communications to the plurality of computing machines from the electronic reserve list, the subsequent communications providing new power limits for the underutilized computing machines, each respective new power limit being lower than the initial respective power limit previously assigned to the respective underutilized computing machines.

6. The method of claim 5, wherein a difference between the initial respective power limits previously assigned to a particular computing machine of the underutilized computing machines and the new power limit for the particular computing machine of the underutilized computing machines is substantially equal to a power allotment granted to a computing machine associated with a top score of the scores.

7. The method of claim 4, wherein the power allotment requested by a computing machine associated with a top-ranked score exceeds an amount of reserve power associated with the underutilized computing machines in the electronic reserve list, and wherein one or more of the plurality of computing machines sends subsequent electronic communications to others of the plurality of computing machines, the subsequent electronic communications comprising a subsequent request comprising a subsequent power value that represents a power allotment, the subsequent request also comprising one or more priority levels.

8. The method of claim 7, wherein the subsequent power value represents a difference between the power allotment requested by a computing machine associated with a top score and an amount of reserve power associated with the computing machines in the electronic reserve list.

9. The method of claim 1, wherein the periodic frequency is about 60 Hz.

10. The method of claim 1, wherein the particular ones of the plurality of computing machines source the granted power allotment from an excess capacity of a single computing machine.

11. The method of claim 1, wherein particular ones of the plurality of computing machines source the granted power allotment from excess capacities of two or more computing machines.

12. A computer-implemented system for allocating power among a plurality of computing machines in a distributed system of computing machines, the system comprising:
- an interface arranged to receive electronic requests from one or more requesting computing machines of the plurality of computing machines for power allotments, the electronic requests each including a power value and one or more priority values, wherein the power value represents a power allotment that is expected to be used by the requesting computing machine during a period of time and the one or more priority values represent priorities of one or more tasks expected to be executed by the requesting computing machine during the period of time;
- a scoring module, executable on a processor, programmed to calculate scores for each of the requesting computing machines using the power values and priority values, where the scores are maintained in an ordered electronic list; and
- a power allotment module, executable on the processor, and programmed to compare scores in the ordered electronic list that are generated by the scoring module and assign power allotments for each of the one or more computing machines using the scores by providing an allotment message to each of the one or more computing machines, the power allotments granted based on a determination of an appropriate position within the ordered electronic list of scores for a calculated first score and placing the calculated first score within the ordered electronic list of scores at the appropriate position, wherein a higher score corresponds to a relatively larger power allotment for a computing machine,
- wherein at least one of the plurality of computing machines determines and reports an excess power capacity, and at least a first computing machine of the plurality of computing machines adjusts current consumption when notified of an occurrence of a current interruption, over-current condition, or maximum load condition.

13. The system of claim 12, wherein the interface is programmed to provide messages to the plurality of computing machines, the messages formatted to cause particular ones of the plurality of computing machines to take a power allotment in accordance with the assigned power allotments.

14. The system of claim 12, wherein the power allotment module is programmed to maintain an electronic reserve list of computing machines that are each operating below a respective power limit assigned to the respective computing machine.

15. The system of claim 14, wherein the interface is programmed to send subsequent communications to the plurality of computing machines from the electronic reserve list, the subsequent communications providing a new power limit for particular ones of the plurality of computing machines from the electronic reserve list, the new power limit being lower than the power limit previously assigned to particular ones of the plurality of computing machines from the electronic reserve list.

16. The method of claim 1, further comprising:
- sending to at least one particular computing machine of the plurality of computing machines an electronic notification during an occurrence of a current interruption, over-current condition, or maximum load condition; and
- adjusting current consumption by the at least one particular computing machine as a response to the electronic notification.

17. The method of claim 1, further comprising:
- determining that the one or more tasks expected to be executed during a predetermined period of time requires more power than an available amount of power assigned to the first computing machine; and
- based on the determination, sending, by the first computing machine, an electronic communication to other ones of the plurality of the computing machines.

18. The system of claim 12, wherein the interface, the scoring module, and the power allotment module are all parts of a first computing machine, the system further comprising:
- a second interface, a second scoring module, and a second power allotment module on a second computing machine,
- wherein the interface is configured to transmit requests to and receive requests from the second interface, and the second interface is configured to transmit requests to and receive requests from the first interface.

* * * * *